US005204955A

United States Patent [19]

Kagei et al.

[11] Patent Number: 5,204,955

[45] Date of Patent: Apr. 20, 1993

[54] NETWORK MANAGEMENT METHOD AND SYSTEM

[75] Inventors: Takashi Kagei, Yokohama; Ryoichi Sasaki, Fujisawa; Michio Suzuki, Yokohama; Keizou Mizoguchi; Hideaki Kobayashi, both of Naka; Kenzo Iioka, Hadano, all of Japan

[73] Assignee: Hitachi, Ltd., Tokyo, Japan

[21] Appl. No.: 580,133

[22] Filed: Sep. 10, 1990

[30] Foreign Application Priority Data

Dec. 18, 1989 [JP] Japan ................................. 1-325964

[51] Int. Cl.[5] ............................................. G06F 13/00

[52] U.S. Cl. .................................... 395/575; 395/200; 364/DIG. 1; 364/284.4; 364/221.7

[58] Field of Search .................. 364/DIG. 1, DIG. 2; 395/200, 325, 575, 700

[56] References Cited

U.S. PATENT DOCUMENTS 4,456,994 6/1984 Segarra ......................... 364/DIG. 1

4,646,298 2/1987 Laws et al. ................... 364/DIG. 1

*Primary Examiner*—Thomas M. Heckler

*Attorney, Agent, or Firm*—Fay, Sharpe, Beall, Fagan, Minnich & McKee

[57] ABSTRACT

A system and method are provided for a network communication protocol specifically directed to implementation of fault management between managers, agents and test objects in the network. Timers for limiting the available times for implicit and explicit reports and instructions are provided to avoid excessive waits for instructions, responses or execution of the overall test. Agents can autonomously report test results to reduce manager responsibilities for improved operating efficiency.

11 Claims, 28 Drawing Sheets

FIG. 6

| CONCEPT OF N3312 | CONCEPT OF N517 |
|---|---|
| TEST CONDUCTOR | MANAGING PROCESS |
| TEST REQUEST RECEIVER OF PRIMARY TEST PERFORMER | AGENT PROCESS |

FIG. 7

| TEST STATE | MEANING |
|---|---|
| IDLE STATE | A STATE DURING WHICH THE TEST IS NOT BEING PERFORMED |
| INITIATION STATE | A STATE IN WHICH THE TEST IS BEING SET UP |
| TESTING STATE | A STATE DURING WHICH THE TEST IS BEING PERFORMED |
| REPORTING STATE | A STATE WHICH TEST RESULTS ARE BEING REPORTED |
| TERMINATION STATE | A STATE IN WHICH THE TEST IS BEING TERMINATED |

FIG. 8

| SERVICE NAME | CONTENTS OF SERVICE |
|---|---|
| TEST-ENROLL SERVICE | A SERVICE WHICH REPORTS A CREATION OF THE TEST OBJECT |
| TEST-DEENROLL SERVICE | A SERVICE WHICH REPORTS A DELETION OF THE TEST OBJECT |
| TEST-CREATE SERVICE | A SERVICE WHICH CREATES THE TEST OBJECTS |
| TEST-DELETE SERVICE | A SERVICE WHICH DELETES THE TEST OBJECTS |
| CHANGE-STATE SERVICE | A SERVICE WHICH CHANGES THE TEST STATE OF THE TEST OBJECT |
| TEST-GET SERVICE | A SERVICE WHICH COLLECTS THE RESULTS OF THE TEST |
| CONNECTIVITY-TEST -REPORT SERVICE | A SERVICE WHICH REPORTS THE RESULTS OF THE CONNECTIVITY TEST |
| LOOPBACK-TEST -REPORT SERVICE | A SERVICE WHICH REPORTS THE RESULTS OF THE LOOPBACK TEST |
| DATA-INTEGRITY-TEST -REPORT SERVICE | A SERVICE WHICH REPORTS THE RESULTS OF THE DATA INTEGRITY TEST |
| FUNCTION-TEST -REPORT SERVICE | A SERVICE WHICH REPORTS THE RESULTS OF THE FUNCTION TEST |

FIG. 11

| TEST-ENROLL SERVICE REQUEST/ INDICATION PARAMETER LIST | DEGREE OF MANDATORY |
|---|---|
| INVOKE IDENTIFIER | M |
| TEST OBJECT CLASS | M |
| TEST OBJECT INSTANCE | M |
| ENROLL TIME | U |
| ATTRIBUTE LIST | U |

FIG. 12

| TEST-DEENROLL SERVICE REQUEST/ INDICATION PARAMETER LIST | DEGREE OF MANDATORY |
|---|---|
| INVOKE IDENTIFIER | M |
| TEST OBJECT CLASS | M |
| TEST OBJECT INSTANCE | M |
| DEENROLL TIME | U |

FIG. 13

| TEST-CREATE SERVICE REQUEST/ INDICATION PARAMETER LIST | DEGREE OF MANDATORY |
|---|---|
| INVOKE IDENTIFIER | M |
| TEST OBJECT CLASS | M |
| ATTRIBUTE LIST | U |

FIG. 14

| TEST-CREATE SERVICE CONFIRM/ RESPONSE PARAMETER LIST | DEGREE OF MANDATORY |
|---|---|
| INVOKE IDENTIFIER | M |
| TEST OBJECT CLASS | M |
| TEST OBJECT INSTANCE | M |
| ATTRIBUTE LIST | C |
| CREATE TIME | U |
| ERRORS | C |

FIG. 15

| TEST-DELETE SERVICE REQUEST/ INDICATION PARAMETER LIST | DEGREE OF MANDATORY |
|---|---|
| INVOKE IDENTIFIER | M |
| TEST OBJECT CLASS | M |
| TEST OBJECT INSTANCE | M |

FIG. 16

| TEST-DELETE SERVICE CONFIRM/ RESPONSE PARAMETER LIST | DEGREE OF MANDATORY |
|---|---|
| INVOKE IDENTIFIER | M |
| TEST OBJECT CLASS | U |
| TEST OBJECT INSTANCE | U |
| DELETE TIME | U |
| ERRORS | C |

FIG. 17

| CHANGE-STATE SERVICE REQUEST/ INDICATION PARAMETER LIST | DEGREE OF MANDATORY |
|---|---|
| INVOKE IDENTIFIER | M |
| TEST OBJECT CLASS | M |
| TEST OBJECT INSTANCE | M |
| TEST STATE | M |

FIG. 18

| CHANGE-STATE SERVICE RESPONSE/ CONFIRM PARAMETER LIST | DEGREE OF MANDATORY |
|---|---|
| INVOKE IDENTIFIER | M |
| TEST OBJECT CLASS | U |
| TEST OBJECT INSTANCE | U |
| TEST STATE | U |
| CHANGE TIME | U |
| ERRORS | C |

FIG. 19

| TEST-GET SERVICE REQUEST/ INDICATION PARAMETER LIST | DEGREE OF MANDATORY |
|---|---|
| INVOKE IDENTIFIER | M |
| TEST OBJECT CLASS | M |
| TEST OBJECT INSTANCE | M |
| ATTRIBUTE IDENTIFIER LIST | M |

FIG. 20

| TEST-GET SERVICE REQUEST/ INDICATION PARAMETER LIST | DEGREE OF MANDATORY |
|---|---|
| INVOKE IDENTIFIER | M |
| TEST OBJECT CLASS | M |
| TEST OBJECT INSTANCE | M |
| GET TIME | U |
| ATTRIBUTE LIST | M |
| ERRORS | C |

FIG. 21

| CONNECTIVITY-TEST-REPORT SERVICE REQUEST/INDICATION PARAMETER LIST | DEGREE OF MANDATORY |
|---|---|
| INVOKE IDENTIFIER | M |
| TEST OBJECT CLASS | M |
| TEST OBJECT INSTANCE | M |
| REPORT TIME | U |
| TEST RESULT | M |
| LAST REPORT | M |
| OTHER INFORMATION | U |

FIG. 22

| LOOPBACK-TEST-REPORT SERVICE REQUEST/INDICATION PARAMETER LIST | DEGREE OF MANDATORY |
|---|---|
| INVOKE IDENTIFIER | M |
| TEST OBJECT CLASS | M |
| TEST OBJECT INSTANCE | M |
| REPORT TIME | U |
| TEST RESULT | M |
| LAST REPORT | M |
| OTHER INFORMATION | U |

FIG. 23

| DATA-INTEGRITY-TEST-REPORT SERVICE REQUEST/INDICATION PARAMETER LIST | DEGREE OF MANDATORY |
|---|---|
| INVOKE IDENTIFIER | M |
| TEST OBJECT CLASS | M |
| TEST OBJECT INSTANCE | M |
| REPORT TIME | U |
| TEST RESULT | M |
| LAST REPORT | M |
| OTHER INFORMATION | U |

FIG. 24

| FUNCTION-TEST-REPORT SERVICE REQUEST/INDICATION PARAMETER LIST | DEGREE OF MANDATORY |
|---|---|
| INVOKE IDENTIFIER | M |
| TEST OBJECT CLASS | M |
| TEST OBJECT INSTANCE | M |
| REPORT TIME | U |
| TEST RESULT | M |
| LAST REPORT | M |
| OTHER INFORMATION | U |

FIG. 25

| TEST-ENROLL SERVICE REQUEST/INDICATION PARAMETER | m-EVENT-REPORT SERVICE REQUEST/ INDICATION PARAMETER |
|---|---|
| INVOKE IDENTIFIER | INVOKE IDENTIFIER |
| | MODE |
| TEST OBJECT CLASS | MANAGED OBJECT CLASS |
| TEST OBJECT INSTANCE | MANAGED OBJECT INSTANCE |
| | EVENT TYPE |
| ENROLL TIME | EVENT TYPE |
| ATTRIBUTE LIST | EVENT ARGUMENT |

FIG. 26

| TEST-DEENROLL SERVICE REQUEST/INDICATION PARAMETER | m-EVENT-REPORT SERVICE REQUEST/ INDICATION PARAMETER |
|---|---|
| INVOKE IDENTIFIER | INVOKE IDENTIFIER |
| | MODE |
| TEST OBJECT CLASS | MANAGED OBJECT CLASS |
| TEST OBJECT INSTANCE | MANAGED OBJECT INSTANCE |
| | EVENT TYPE |
| DEENROLL TIME | EVENT TIME |
| | EVENT ARGUMENT |

FIG. 27

| TEST-CREATE SERVICE REQUEST/INDICATION PARAMETER | m-CREATE SERVICE REQUEST/ INDICATION PARAMETER |
|---|---|
| INVOKE IDENTIFIER | INVOKE IDENTIFIER |
| TEST OBJECT CLASS | MANAGED OBJECT CLASS |
| | MANAGED OBJECT INSTANCE |
| | ACCESS CONTROL |
| | REFERENCE OBJECT INSTANCE |
| ATTRIBUTE LIST | ATTRIBUTE LIST |

FIG. 28

| TEST-CREATE SERVICE RESPONSE/CONFIRM PARAMETER | m-CREATE SERVICE RESPONSE/CONFIRM PARAMETER |
|---|---|
| INVOKE IDENTIFIER | INVOKE IDENTIFIER |
| TEST OBJECT CLASS | MANAGED OBJECT CLASS |
| TEST OBJECT INSTANCE | MANAGED OBJECT INSTANCE |
| ATTRIBUTE LIST | ATTRIBUTE LIST |
| CREATE TIME | CURRENT TIME |
| ERRORS . | ERRORS |

FIG. 29

| TEST-DELETE SERVICE REQUEST/INDICATION PARAMETER | m-DELETE SERVICE REQUEST/ INDICATION PARAMETER |
|---|---|
| INVOKE IDENTIFIER | INVOKE IDENTIFIER |
| TEST OBJECT CLASS | BASE OBJECT CLASS |
| TEST OBJECT INSTANCE | BASE OBJECT INSTANCE |
| | SCOPE |
| | FILTER |
| | ACCESS CONTROL |
| | SYNCHRONIZATION |

FIG. 30

| TEST-DELETE SERVICE RESPONSE/CONFIRM PARAMETER | m-DELETE SERVICE RESPONSE/CONFIRM PARAMETER |
|---|---|
| INVOKE IDENTIFIER | INVOKE IDENTIFIER |
| | LINKED IDENTIFIER |
| TEST OBJECT CLASS | MANAGED OBJECT CLASS |
| TEST OBJECT INSTANCE | MANAGED OBJECT INSTANCE |
| DELETE TIME | CURRENT TIME |
| ERRORS | ERRORS |

FIG. 31

| CHANGE-STATE SERVICE RESPONSE/CONFIRM PARAMETER | m-SET SERVICE REQUEST/INDICATION PARAMETER |
|---|---|
| INVOKE IDENTIFIER | INVOKE IDENTIFIER |
| | MODE |
| TEST OBJECT CLASS | BASE OBJECT CLASS |
| TEST OBJECT INSTANCE | BASE OBJECT INSTANCE |
| | SCOPE |
| | FILTER |
| | ACCESS CONTROL |
| | SYNCHRONIZATION |
| TEST STATE | ATTRIBUTE LIST |

FIG. 32

| CHANGE-STATE SERVICE RESPONSE/CONFIRM PARAMETER | m-SET SERVICE RESPONSE/CONFIRM PARAMETER |
|---|---|
| INVOKE IDENTIFIER | INVOKE IDENTIFIER |
| | LINKED IDENTIFIER |
| TEST OBJECT CLASS | MANAGED OBJECT CLASS |
| TEST OBJECT INSTANCE | MANAGED OBJECT INSTANCE |
| TEST STATE | ATTRIBUTE LIST |
| CHANGE TIME | CURRENT TIME |
| ERRORS | ERRORS |

FIG. 33

| TEST-GET SERVICE REQUEST/INDICATION PARAMETER | m-GET SERVICE REQUEST/INDICATION PARAMETER |
|---|---|
| INVOKE IDENTIFIER | INVOKE IDENTIFIER |
| TEST OBJECT CLASS | BASE OBJECT CLASS |
| TEST OBJECT INSTANCE | BASE OBJECT INSTANCE |
| | SCOPE |
| | FILTER |
| | ACCESS CONTROL |
| | SYNCHRONIZATION |
| ATTRIBUTE IDENTIFIER LIST | ATTRIBUTE IDENTIFIER LIST |

FIG. 34

| TEST-GET SERVICE RESPONSE/CONFIRM PARAMETER | m-GET SERVICE RESPONSE/CONFIRM PARAMETER |
|---|---|
| INVOKE IDENTIFIER | INVOKE IDENTIFIER |
| | LINKED IDENTIFIER |
| TEST OBJECT CLASS | MANAGED OBJECT CLASS |
| TEST OBJECT INSTANCE | MANAGED OBJECT INSTANCE |
| GET TIME | CURRENT TIME |
| ATTRIBUTE LIST | ATTRIBUTE LIST |
| ERRORS | ERRORS |

FIG. 35

| CONNECTIVITY-TEST-REPORT SERVICE REQUEST/INDICATION PARAMETER | m-EVENT-REPORT SERVICE REQUEST/INDICATION PARAMETER |
|---|---|
| INVOKE IDENTIFIER | INVOKE IDENTIFIER |
| | MODE |
| TEST OBJECT CLASS | MANAGED OBJECT CLASS |
| TEST OBJECT INSTANCE | MANAGED OBJECT INSTANCE |
| | EVENT TYPE |
| REPORT TIME | EVENT TIME |
| TEST RESULT | EVENT ARGUMENT |
| LAST REPORT | |
| OTHER INFORMATION | |

FIG. 36

| LOOPBACK-TEST-REPORT SERVICE REQUEST/INDICATION PARAMETER | m-EVENT-REPORT SERVICE REQUEST/INDICATION PARAMETER |
|---|---|
| INVOKE IDENTIFIER | INVOKE IDENTIFIER |
| | MODE |
| TEST OBJECT CLASS | MANAGED OBJECT CLASS |
| TEST OBJECT INSTANCE | MANAGED OBJECT INSTANCE |
| | EVENT TYPE |
| REPORT TIME | EVENT TIME |
| TEST RESULT | EVENT ARGUMENT |
| LAST REPORT | |
| OTHER INFORMATION | |

FIG. 37

| DATA-INTEGRITY-TEST-REPORT SERVICE REQUEST/INDICATION PARAMETER | m-EVENT-REPORT SERVICE REQUEST/INDICATION PARAMETER |
|---|---|
| INVOKE IDENTIFIER | INVOKE IDENTIFIER |
| | MODE |
| TEST OBJECT CLASS | MANAGED OBJECT CLASS |
| TEST OBJECT INSTANCE | MANAGED OBJECT INSTANCE |
| | EVENT TYPE |
| REPORT TIME | EVENT TIME |
| TEST RESULT | EVENT ARGUMENT |
| LAST REPORT | |
| OTHER INFORMATION | |

FIG. 38

| FUNCTION-TEST-REPORT SERVICE REQUEST/INDICATION PARAMETER | m-EVENT-REPORT SERVICE REQUEST/INDICATION PARAMETER |
|---|---|
| INVOKE IDENTIFIER | INVOKE IDENTIFIER |
| | MODE |
| TEST OBJECT CLASS | MANAGED OBJECT CLASS |
| TEST OBJECT INSTANCE | MANAGED OBJECT INSTANCE |
| | EVENT TYPE |
| REPORT TIME | EVENT TIME |
| TEST RESULT | EVENT ARGUMENT |
| LAST REPORT | |
| OTHER INFORMATION | |

FIG. 39

| ATTRIBUTE LIST OF CONNECTIVITY TEST CLASS | CONTENTS |
|---|---|
| (TEST STATE) | TEST STATE OF THE TEST OBJECT |
| (TIMEOUT PERIOD) | MAXIMAL TIME DURING WHICH THE CONNECTIVITY TEST CAN BE PERFORMED |
| (TESTED OBJECT) | AN ENTITY WHICH SENDS THE CONNECTION ESTABLISHMENT CALL |
| (PAIR OBJECT) | AN ENTITY WHICH RECEIVES THE CONNECTION ESTABLISHMENT CALL |
| (ESTABLISHED TIME) | TIME FOR THE CONNECTION ESTABLISHMENT |
| (REPORT TIME) | 0 TIME WHEN THE TEST OBJECT REPORT THE TEST RESULT |
| (LAST REPORT) | 0 INDICATION FOR WHETHER THE REPORT OF THE TEST RESULTS ARE CONTINUED OR NOT |
| (TEST RESULT) | 0 TEST RESULT OF THE CONNECTIVITY TEST |
| (EFFECTIVE TIME) | 0 EFFECTIVE TIME DURING WHEN THE TEST OBJECT EXISTS |

FIG. 40

| ATTRIBUTE LIST OF THE LOOPBACK TEST | CONTENTS |
|---|---|
| (TEST STATE) | TEST STATE OF THE TEST OBJECT |
| (REPORT TIME) | TIME WHEN THE TEST OBJECT REPORT THE TEST RESULT |
| (LAST REPORT) | INDICATION FOR WHETHER THE REPORT OF THE TEST RESULT OF THE CONNECTIVITY TEST |
| (TEST RESULT) | TEST RESULT OF THE LOOPBACK TEST |
| (EFFECTIVE TIME) | EFFECTIVE TIME DURING WHEN THE TEST OBJECT EXISTS |
| (SOURCE OBJECT) | MANAGED OBJECT WHICH SENDS THE TEST DATA |
| (DESTINATION OBJECT) | MANAGED OBJECT WHICH RECEIVES THE TEST DATA |
| (INTERMEDIATE OBJECT) | THE LOCATION WHERE THE TEST DATA IS TURNED BACK |
| (TIMEOUT PERIOD) | MAXIMAL TIME DURING WHICH THE LOOPBACK TEST CAN BE PERFORMED |

FIG. 41

| ATTRIBUTE LIST OF THE DATA INTEGRITY TEST | CONTENTS |
|---|---|
| (TEST STATE) | TEST STATE OF THE TEST OBJECT |
| (REPORT TIME) | TIME WHEN THE TEST OBJECT REPORT THE TEST RESULT |
| (LAST REPORT) | INDICATION FOR WHETHER THE REPORT OF THE TEST RESULT ARE CONTINUED OR NOT |
| (TEST RESULT) | TEST RESULT OF THE DATA INTEGRITY TEST |
| (EFFECTIVE TIME) | EFFECTIVE TIME DURING THE TEST OBJECT EXISTS |
| (TIMEOUT PERIOD) | MAXIMAL TIME DURING WHICH DATA INTEGRITY TEST CAN BE PERFORMED |
| (TESTED OBJECT) | AN ENTITY WHICH SENDS THE TEST DATA |
| (PAIR OBJECT) | AN ENTITY WHICH RECEIVES THE TEST DATA |
| (TEST DATA) | A DATA WHICH IS USED IN THE DATA INTEGRITY TEST |
| (FAILURE CAUSE) | CAUSE WHY THE DATA INTEGRITY TEST WAS FAILED |

FIG. 42

| ATTRIBUTE LIST OF THE FUNCTION TEST | CONTENTS |
|---|---|
| (TEST STATE) | TEST STATE OF THE TEST OBJECT |
| (REPORT TIME) | TIME WHEN THE TEST OBJECT REPORT THE TEST RESULT |
| (LAST REPORT) | INDICATION FOR WHETHER THE REPORT OF THE TEST RESULT ARE CONTINUED OR NOT |
| (TEST RESULT) | TEST RESULT OF THE FUNCTION TEST |
| (EFFECTIVE TIME) | EFFECTIVE TIME DURING THE TEST OBJECT EXISTS |
| (TESTED OBJECT) | MANAGED OBJECT WHICH PERFORMS THE FUNCTION TEST |
| (TIMEOUT PERIOD) | MAXIMAL TIME DURING WHICH THE FUNCTION TEST CAN BE PERFORMED |

NETWORK MANAGEMENT METHOD AND SYSTEM

BACKGROUND OF THE INVENTION

1. Field of the Invention

This invention relates to information processing systems and in particular to an open network system and the management of system communication, therein. More particularly, it relates to fault management for the system and the protocols for exchanging network management information relating to tests for faults between system management and agent devices.

2. Description of the Prior Art

Systems management is the science of providing mechanisms and methods for the monitoring, control and co-ordination of the devices and resources within a network system. More simply, for an expansive computer system comprised of many elements, it concerns the ways that must be devised so that the elements can work together and communicate. The elements of the system are typically made by a number of different manufacturers so if the elements are to work together they must have a common means, accepted by the manufacturers, for communication and cooperation. The standards appropriate to the management of open communications and operations in a network are generally referred to as "Open Systems Interconnection" (OSI) standards.

The International Organization for Standardization (ISO) has been striving to set such common standards. These include specified procedures for carrying out necessary systems management activities. Such activities are generally grouped into five areas: fault management, configuration management, accounting management, performance management and security management. The subject matter of this invention generally concerns the activity of fault management.

The ISO has generally described systems management standards in a project paper entitled Information Processing Systems—Open Systems Interconnection—Systems Management: Overview, ISO/IEC JTC1/SC21/WG4 N571, July 1988. As described therein, the management functions of a conventional network management system are divided into managing processes and agent processes. The object of management is referred to as a "managed object." A managed object is a system resource that is subject to management, such as a layer entity, a connection or an item of physical communications equipment. A managing process has responsibility for a management activity. An agent process manages, at the request of a managing process, the associated managed objects. It is important to note that network management information relating to the managed object is exchanged between the managing process and the agent process.

For simplification purposes, hereafter a network managing apparatus performing a managing process will be referred to as a "manager" and a network managing apparatus performing an agent process will be referred to as an "agent".

The ISO has also generally described a protocol for fault management in a paper entitled Information Processing Systems—Open Systems Interconnection—Systems Management: Fault Management Working Document ISO/IEC JTC1/SC21 N3312, January, 1989. Much of the information necessary for fault management is derived from a systems function identified as confidence and diagnostic testing which provides for one user to direct another user to perform a test on a managed object to determine if it is capable of performing its service or to assist in diagnosis of a fault. This paper provides a model for the OSI environment in the operation of a test. The initiator of a test is referred to as a test conductor. It requests the execution of a test. A test performer executes the test. Test performers are considered to be managed objects and are sometimes referred to as "test objects." In a test whose execution is dispersed to involve more than one open system, separate test performers exist in each system. The test performer with whom the test conductor communicates is referred to as the primary test performer. The test performer with whom the primary test performer communicates is called the secondary test performer. The primary test performer includes a test request receiver which receives a test request from the test conductor, a test object comprising the test itself and the testing equipment, and a resource under test as the resource which is utilized in the test.

Problems to be Solved by the Invention

The OSI standards described above merely specify an abstract test model but do not at all prescribe any definite techniques for performing the test such as protocols or their timings. When considering a network management system for concentrated managing of a large network including a large number of sub-networks, ultra high speed and performance levels are required. It is more effective to dispose agents for managing the individual sub-networks in order to divide functionally the management function of the manager as described in the OSI document cited above (N3312). However, no technical solution at all has been proposed or defined on how to divide functionally the management function of the manager for suitable management of the network. Each agent that manages a sub-network operates in any one of a plurality of test operation modes (idle state, initiation state, test state, etc., as identified in the OSI paper, N3312) and it becomes an important technical problem for the distribution of the network management function whether the switch of these test operation modes should be made by the agent itself or by the manager.

The present invention contemplates new and improved methods and systems which overcome the foregoing problems to provide a high quality network management system with high speed fault management protocols that require reduced manager obligations for the fault management and test protocols.

BRIEF DESCRIPTION OF THE INVENTION

In accordance with the present invention, a network management method is provided wherein the agent apparatus autonomously notifies the manager apparatus of the subject and content of a test made for the sub-network, executes the test in accordance with the test content, reports sequentially the test result to the manager apparatus, autonomously terminates the test and sends the termination report of the test to the manager apparatus. The manager apparatus is equipped with timer means capable of setting arbitrarily the period from the execution till timeout, and executes or suspends the timer means (TIMER #1) in accordance with the report or the report content from the agent apparatus. The manager apparatus further initiates the termination process of the test for the agent apparatus when the timer means comes to timeout.

In a network system equipped with a test mode in which a test for an arbitrary sub-network is autonomously executed and another test mode in which the test described above is executed by the manager apparatus, the manager apparatus, operating in a second test mode, is equipped with timer means (TIMER #2) capable of setting arbitrarily the period from the start till timeout, gives the test content for an arbitrary sub-network or the instruction relating to the execution or suspension of the test operation to the agent apparatus which manages this subnetwork, starts the timer means (Timer #2) , suspends the timer means (Timer #2) in accordance with a predetermined response content sent from the agent apparatus in response to the instruction described above and issues the termination instruction of the test in accordance with timeout of the timer means or the last report of the test result made by the agent apparatus. Further, the manager apparatus is equipped with timer means (Timer #3) capable of setting arbitrarily the period from the start till timeout, starts the timer means (Timer #3) in accordance with a predetermined response content from the agent apparatus, suspends this timer means in accordance with the last test report sent from the agent apparatus and makes the termination instruction of the test irrespective of the existence of the last report of the test result when this timer means comes to timeout.

The agent also is equipped with timer means capable of setting arbitrarily the period from the start till timeout, executes the timer means in accordance with the response content delivered in response to each instruction from the manager, suspends the timer means in accordance with a predetermined instruction content from the manager and makes autonomously the test termination irrespective of the termination instruction of the test from the manager when the timer means comes to timeout.

In accordance with another aspect of the present invention, the function of executing, reporting and terminating autonomously a test for a sub-network is provided to the agent and the manager performs the switch instruction of the test operation mode in accordance with timeout of its built-in timer. Therefore, the functions of the manager can be reduced, and it is possible to prevent the uncontrolled state of the testing for a long time without termination of the test, and the erroneous operation due to the continuance of the test object without disappearing for a long time. In the network system equipped with a test mode in which the test for an arbitrary sub-network is executed autonomously and another test mode in which the test described above is executed by the manager apparatus, if the test is interrupted due to a failure or the like, the manager and the agent give the switch instruction of the test operation mode or execute the switch in accordance with the timer operations of their built-in timer means.

Accordingly, it is possible to prevent the uncontrolled state of the test for a long time without terminating and the erroneous operation due to the continuance of the test object without disappearing for a long time. Thus, a network system and a network management method both suitable for the network management can be accomplished.

It is an object of the present invention to provide a network system and a network management method both suitable for network management having concrete protocols between a plurality of agents that individually manage the sub-networks and a manager in communication with each agent for managing the network as a whole.

It is another object of the present invention to provide a network system and a network management method suitable for network management by providing the agent with an autonomous test function for the sub-network or letting the manager or the agent bear the switch function of the test operation modes in accordance with a protocol.

For ease of understanding, assume a model wherein the test model of the N3312 paper is made to correspond to the test model of the N551 paper as shown in FIG. 6. In the model, a test conductor and a managing process, and a test request receiver of a primary test performance and an agent process may be considered to correspond to one another, respectively, as shown in FIG. 6.

BRIEF DESCRIPTION OF THE DRAWINGS

FIG. 6 is a comparative diagram showing a correspondence table of the concepts of a test model in accordance with ISO Paper No. N3312 and a management model in accordance with ISO Paper No. N517;

FIG. 7 is a table showing the test states which a test object of the present invention can take;

FIG. 8 is a table showing the services of the present invention;

FIG. 11 is a table showing the parameters which are provided by the primitive of the request and indication of a TEST-ENROL service;

FIG. 12 is a table showing the parameters which are provided by the primitive of the request and indication of a TEST-DEENROL service;

FIG. 13 is a table showing the parameters which are provided by the primitive of the request and indication of a TEST-CREATE service;

FIG. 14 is a table showing the parameters which are provided by the primitive of the response and confirm of a TEST-CREATE service;

FIG. 15 is a table showing the parameters which are provided by the primitive of the request and indication of a TEST-DELETE service;

FIG. 16 is a table showing the parameters which are provided by the primitive of the response and confirm of a TEST-DELETE service;

FIG. 17 is a table showing the parameters which are provided by the primitive of the request and indication of a CHANGE-STATE service;

FIG. 18 is a table showing the parameters which are provided by the primitive of the response and confirm of a CHANGE-STATE service;

FIG. 19 is a table showing the parameters which are provided by the primitive of the request and indication of a TEST-GET service;

FIG. 20 is a table showing the parameters which are provided by the primitive of the response and confirm of a CONNECTIVITY-TEST-GET service;

FIG. 21 is a table showing the parameters which are provided by the primitive of the request and indication of a CONNECTIVITY-TEST-REPORT service;

FIG. 22 is a table showing the parameters which are provided by the primitive of the request and indication of a LOOPBACK-TEST-REPORT service;

FIG. 23 is a table showing the parameters which are provided by the primitive of the request and indication of a DATA-INTEGRITY-TEST-REPORT service;

FIG. 24 is a table showing the parameters which are provided by the primitive of the request and indication of a FUNCTION-TEST-REPORT service;

FIG. 25 is a diagram showing the mapping of the parameters which are provided by the primitive of the request and indication of the TEST-ENROL service, to parameters which are provided by the primitive of the request and indication of an m-Event-Report service provided by the CMISE;

FIG. 26 is a diagram showing the mapping of the parameters which are provided by the primitive of the request and indication of the TEST-DEENROL service, to the parameters which are provided by the primitive of the request and indication of the m-Event-Report service provided by the CMISE;

FIG. 27 is a diagram showing mapping of the parameters which are provided by the primitive of the request and indication of the TEST-CREATE service, to parameters which are provided by the primitive of the request and indication of an m-Create service provided by the CMISE;

FIG. 28 is a diagram showing the mapping of the parameters which are provided by the primitive of the response and confirm of the TEST-CREATE service, to parameters which are provided by the primitive of the response and confirm of the m-Create service provided by the CMISE;

FIG. 29 is a diagram showing the mapping of the parameters which are provided by the primitive of the request and indication of the TEST-DELETE service, to parameters which are provided by the primitive of the request and indication of an m-Delete service provided by the CMISE:

FIG. 30 is a diagram showing the mapping of the parameters which are provided by the primitive of the response and confirm of the TEST-DELETE service, to parameters which are provided by the primitive of the response and confirm of the m-Delete service provided by the CMISE;

FIG. 31 is a diagram showing the mapping of the parameters which are provided by the primitive of the request and indication of the CHANGE-STATE service, to parameters which are provided by the primitive of the request and indication of an m-Set service provided by the CMISE;

FIG. 32 is a diagram showing the mapping of the parameters which are provided by the primitive of the response and confirm of CHANGE-STATE service, to parameters which the primitive of the response and confirm of an m-Set service provided by the CMISE;

FIG. 33 is a diagram showing the mapping of the parameters which are provided by the primitive of the request and indication of TEST-GET service, to the parameters which are provided by the primitive of the request and indication of an m-Get service provided by the CMISE;

FIG. 34 is a diagram showing the mapping of the parameters which are provided by the response and confirm of the TEST-GET service, to the parameters which are provided by the primitive of the response and confirm of the m-Get service provided by the CMISE;

FIG. 35 is a diagram showing the mapping of the parameters which are provided by the request and indication of the CONNECTIVITY-TEST-REPORT service, to the parameters which are provided by the primitive Of the request and indication of an m-Event-Report service provided by the CMISE;

FIG. 36 is a diagram showing the mapping of the parameters which are provided by the primitive of the request and indication of the LOOPBACK-TESTREPORT service to the parameters which are provided by the primitive of the request and indication of the m-Event-Report service provided by the CMISE;

FIG. 37 is a diagram showing the mapping of the parameters which are provided by the primitive of the request and indication of the DATA-INTEGRITY-TEST-REPORT service to the parameters which are provided by the primitive of the request and indication of the m-Event-Report service provided by the CMISE;

FIG. 38 is a diagram showing the mapping of the parameters which are provided by the primitive of the request and indication of the FUNCTION-TEST-REPORT service, to the parameters which are provided by the primitive of the request and indication of the m-Event-Report service provided by the CMISE:

FIG. 39 is a table showing the attributes of the Connectivity Test Class in accordance with the present invention;

FIG. 40 is a table showing the attributes of the Loopback Test Class in accordance with the present invention;

FIG. 41 is a table showing the attributes of the Data Integrity Test Class in accordance with the present invention;

FIG. 42 is a table showing the attributes of the Function Test Class in accordance with the present invention;

DETAILED DESCRIPTION OF THE PREFERRED EMBODIMENTS

Figure 1:
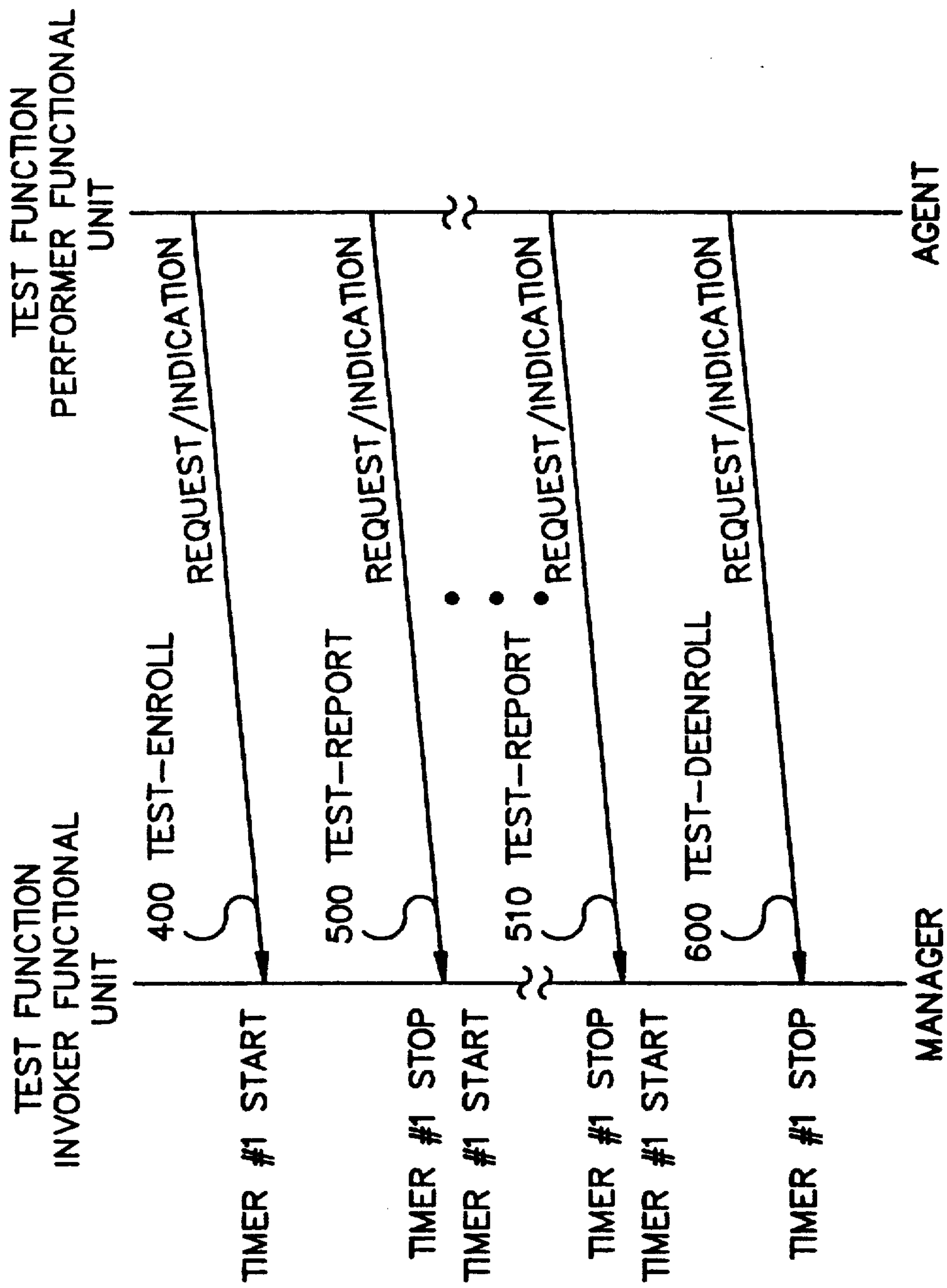
FIG. 1 is a flow diagram showing a protocol sequence when an agent reports the result of an autonomous test to a manager.

Referring now to the drawings where the showings are for purposes of illustrating preferred embodiments of the invention only and not for purposes of limitation, the Figures show a network management system and method useful for implementation of fault management in an open information processing system.

The logical construction of the manager and the agent is best explained before the particular system configuration and operation are described.

As described in the ISO Paper No. N3312 cited above, a test is conducted to the test object. The test object has various test states such as an idle state, an initiation state, a testing state, a reporting state and a termination state, as are shown and described in FIG. 7. A failure state may also exist but is not necessary for the description of the present invention. Transition through the test states will determine the sequence the test.

Figure 9:
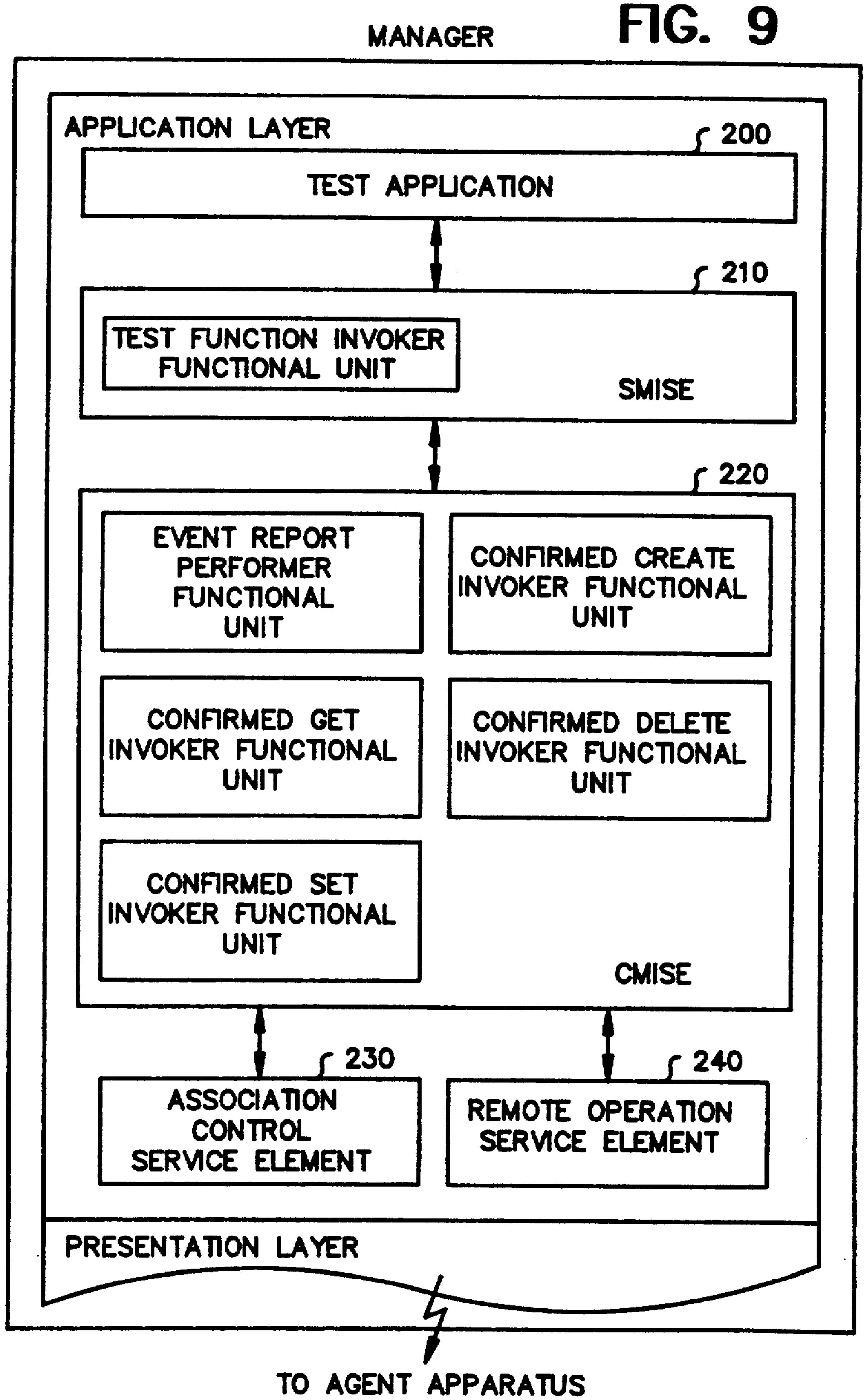
FIG. 9 is a logical structural view of a manager in accordance with the present invention.
Figure 10:
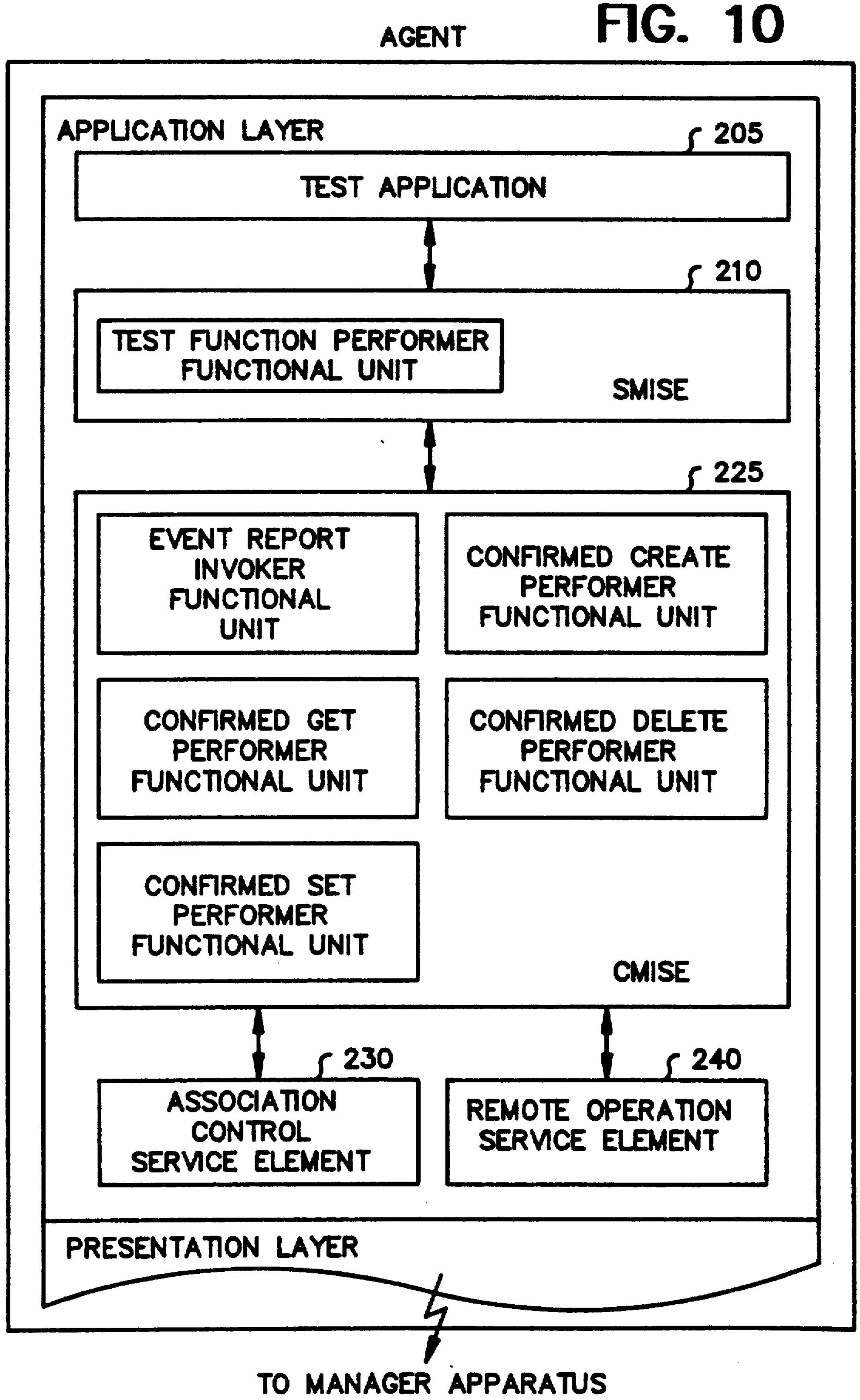
FIG. 10 is a logical structural view of an agent in accordance with the present invention.

The present invention provides the stipulated services tabulated in FIG. 8. FIG. 9 is a logical block diagram of the configuration of a manager for executing these services and FIG. 10 is a logical block diagram of the configuration of an agent for executing the services. The services are ones which the test function invoker functional unit (FIG. 9) and the test function performer functional unit (FIG. 10) of the Specific Management Information Service Entity ("SMISE") 210 provide to the test applications 200, 205, respectively, by utilizing the Common Management Information Service Entity ("CMISE") 220, 225. (Common elements to both assemblies are identified by like numerals.)

The manager and the agent are modelled by an OSI7 hierarchical model, i.e., a seven layer Basic Reference Model (note ISO Paper No. N571 at pg. 1). FIGS. 9 and 10 show the configuration of the application layers of the manager and agent, respectively. The application layer consists of an Association Control Service Element 230, a Remote Operation Service Element 240, CMISE 220, 225, SMISE 210 and test applications 200, 205.

The services and protocols provided by the Association Control Service Element 230 are prescribed in ISO/IEC 8649 Information Processing Systems Open Systems Interconnection—Service Definition for the Association Control Service Element and ISO/IEC 8650 Information Processing Systems—Open Systems Interconnection—Protocol Specification for the Association Control Service Element.

The services and protocols provided by the Remote Operation Service Element 240 are prescribed in ISO/IEC 9072-1 Information Processing Systems Text Communication—Remote Operations—Part 1: Model, Notation and Service Definition and in ISO/ IEC 9072-2 Information Processing Systems—Text Communication—Remote Operations—Part 2: Protocol Specification.

The services and protocols provided by the CMISE are prescribed in ISO/IEC DIS 9595-2 Information Processing Systems—Open Systems Interconnection Management Information Service Definition—Part 2: Common Management Information Service and in ISO/IEC DIS 9596-2 Information Processing Systems—Open Systems Interconnection—Management Information Protocol Specification—Part 2: Common Management Information Protocol.

Each CMISE 220, 225 consists of several functional units. The present invention includes, in the configuration of the manager CMISE 220, an event report performer functional unit, confirmed get invoker functional unit, confirmed set invoker functional unit, confirmed create invoker functional unit, and confirmed delete invoker functional unit.

Included in the configuration of CMISE 225 of the agent, are an event report invoker functional unit, confirmed get performer functional unit, confirmed set performer functional unit, confirmed create performer functional unit, and confirmed delete performer functional unit.

Next, each of the services defined in the present invention will be explained. Generally, a service consists of four primitives, that is, request, indication, response and confirm.

A TEST-ENROL service is the service which reports to the manager that the agent has generated the test object. This service consists of the primitives of request and indication and has parameters as shown in FIG. 11. The parameters are mapped to the primitives of request and indication of an m-Event-Report service of CMISE 220, 225 as shown in FIG. 25, respectively.

It is possible by use of this TEST-ENROL service to report to the manager that the agent has autonomously started the test. It is also possible to report to the manager which test the agent executes, by use of the Test Object Class which is the parameter of the primitive of the request and indication of the TESTENROL service shown in FIG. 11. The tests can be recognized by the Test Object Class parameter and the Test Object Instance parameter. The time at which the agent starts the test and the condition under which the test is started can be known by use of the other parameters shown in FIG. 11.

The TEST-DEENROL service is the service which reports to the manager that the agent has deleted the test. This service consists of the primitives of request and indication and has the parameters shown in FIG. 12. The parameters are mapped to the primitives of request and indication of the m-Event Report service of CMISE 220, 225 as shown in FIG. 26, respectively.

It is possible by use of this TEST-DEENROL service to report to the manager that the agent terminates the test which it has started autonomously. The finished tests can be distinguished by the Test Object Class parameter and Test Object Instance parameter as the parameters of the primitive of the request and indication of the TEST-DEENROL service shown in FIG. 12. It is possible to know the time at which the agent terminates the test, by use of the Deenrol Time parameter.

The TEST-CREATE service is the service by which the manager requests the agent to create the test object. This service consists of primitives of request, indication, response and confirm and the primitives of the request and indication of this service have the parameters shown in FIG. 13. The primitives of the confirm and response for this service has the parameters shown in FIG. 14. As shown in FIG. 27, respectively, the parameters of the request and indication of this service are mapped to the primitives of the request and indication of the m-Create service of the CMIS 220, 225. The parameters of the response and confirm of this service are mapped to the primitives of the response and confirm of the m-Create service of the CMISE 220, 225 as shown in FIG. 28, respectively.

The manager can request the agent to execute the test by use of this TEST-CREATE service. The manager can let the agent know which kind of test is to be executed by use of the Test Object Class parameters as the parameters of the primitives of the request and indication of the TEST-CREATE service shown in FIG. 13. The manager can set the condition of the test by use of the Attribute List parameters.

The manager can know which test is started, by use of the Test Object Class parameter and the Test Object Instance parameter as the parameters of the primitives of the response and confirm of the TEST-CREATE service shown in FIG. 14. Further, the manager can know the time of the start of the test by use of the Create Time parameter, and can know the cause why the start of the test has failed, by use of the Errors parameter.

The TEST-DELETE service is the service by which the manager requests the agent to delete the test object. This service consists of the primitives of request, indication, response and confirm, and the primitives of the request and indication of this service have the parameters shown in FIG. 15. The primitives of the response and confirm of this service have the parameters shown in FIG. 16. The parameters of the primitives of the request and indication of this service are mapped to the primitives of the request and indication of the m-Delete service of the CMISE 220, 225 as shown in FIG. 29, respectively. The parameters of the primitives of the response and confirm of this service are mapped to the primitives of the response and confirm of the m-Delete service of CMISE 220, 225 as shown in FIG. 30.

The manager can instruct the end of the test to the agent by use of this Test-Delete service. The manager can instruct which test should be terminated, by use of the Test Object Class parameter and Test Object Instance parameter as the parameters of the primitives of the request and indication of the TEST-DELETE service shown in FIG. 15.

The manager can know which test has been terminated by use of the Test Object Class parameter and Test Object Instance parameter as the parameters of the primitives of the response and confirm of the TEST-DELETE service shown in FIG. 16. The manager can know the termination time of the test by use of the Delete Time parameter. Further, the manager can know the cause of the failure of the termination of the test, by use of the Errors parameter.

The CHANGE-STATE service is the service by which the manager requests the agent to change the test state of the test object. This service consists of the primitives of request, indication, response and confirm and the primitives of the request and indication of this service have the parameters shown in FIG. 17. The primitives of the response and confirm of this service have the parameters shown in FIG. 18. The parameters of the primitives of the request and indication of this service are mapped to the request and indication of the m-Set service of the CMISE 220, 225 as shown in FIG. 31, respectively. The parameters of the primitives of the response and confirm of this service are mapped to the primitives of the response and confirm of the m-Set service of the CMISE 220, 225 as shown in FIG. 32, respectively.

The execution control of the test can be made by use of this CHANGE-STATE service. In other words, the test can be executed by changing the test state to the initiation state, or the test can be suspended by changing the test state to the idle state.

The test whose execution is to be controlled can be designated by use of the Test Object Class parameter and the Test Object Instance parameter as the parameters of the primitives of the request and indication of the CHANGE-STATE service shown in FIG. 17. The test can be executed by setting a value representing the initiation state to the Test State parameter or can be suspended by setting a value representing the idle state.

The manager can know to which test the execution control is made, by use of the Test Object Class parameter and Test Object Instance parameter as the parameters of the primitives of the response and confirm of the CHANGE-STATE service shown in FIG. 18. The manager can know the time of the execution control for the test, by use of the Change Time parameter. Furthermore, the manager can know the cause of the failure of the execution control for the test, by use of the Errors parameter.

The TEST-GET service is the one by which the manager requests the agent to collect the test result that the test object has. This service consists of the primitives of request, indication, response and confirm, and the primitives of the request and indication of this service have the parameters shown in FIG. 19. The primitives of the response and confirm of this service have the parameters shown in FIG. 20. The parameters of the primitives of the request and indication of this service are mapped to the primitives of the request and indication of the m-Get service of CMISE 220, 225 shown in FIG. 33, respectively. The parameters of the primitives of the response and confirm of this service are mapped to the primitives of the response and confirm of the m-Get service of CMISE 220, 225 as shown in FIG. 34, respectively.

The test result can be collected by use of this Test-Get service. It is possible to designate the test result of which test should be collected, by use of the Test Object Class parameter and Test Object Instance parameter as the parameters of the primitives of the request and indication of the TEST-GET service shown in FIG. 19. The kind of the test result to be collected can be designated by use of the Attribute Identifier List parameter.

It is possible to distinguish to which test the collected test result belongs, by use of the Test Object Class parameter and the Test Object Instance parameter as the parameters of the primitives of the response and confirm of the TEST-GET service shown in FIG. 20. The time of collection of the test result can be known by use of the Get Time parameter, and the test result can be known by use of the Attribute List parameter. Further, the reason why the test information cannot be collected can be known by use of the Errors parameter.

The CONNECTIVITY-TEST-REPORT service is the one by which the agent reports the test result of the connectivity test to the manager. This service consists of the primitives of request and indication and has the parameters shown in FIG. 21. The parameters are mapped to the primitives of the request and indication of the m-Event-Report service of CMISE 220, 225 as shown in FIG. 35, respectively.

The agent can report the test result of the connectivity test to the manager by use of this CONNECTIVITY-TEST-REPORT service. It is possible to know which result of connectivity test has been reported, by use of the Test Object Class parameter and the Test Object Instance parameter as the parameters of the primitives of the request and indication of the CONNECTIVITY-TEST-REPORT service shown in FIG. 21 The time when the test result is reported can be known by use of the Report Time parameter. The result of the connectivity test can be known by use of the Test Result parameter. Whether or not the reported test result is the last report can be known by use of the Last Report parameter. The information other than the test result can be known by use of the Other Information parameter.

The LOOPBACK-TEST-REPORT service is the one by which the agent reports the test result of the loopback test to the manager. This service consists of the primitives of the request and indication and has the parameters, as shown in FIG. 22. These parameters are mapped to the primitives of the request and indication of the m-Event-Report service of CMISE 220, 225 as shown in FIG. 36, respectively.

The agent can report the test result of the loopback test to the manager by use of this LOOPBACK-TEST-REPORT service. It is possible to know which result of loopback test has been reported, by use of the parameter of the primitive of the indication as the request of the LOOPBACK-TEST-REPORT service shown in FIG. 22, the Test Object Class parameter and the Test Object Instance parameter. The time when the test result has been reported can be known by use of the Report Time parameter. The test result of the loopback test can be known by use of the Test Result parameter. Whether or not the reported test result is the last report can be known by use of the Last Report parameter. The information other than the test result of the loopback test can be known by use of the Other Information parameter.

The DATA-INTEGRITY-TEST-REPORT service is the one by which the agent reports the test result of the data integrity test to the manager. This service consists of the primitives of the request and indication and has the parameters shown in FIG. 23. These parameters are mapped to the primitives of the request and indication of the m-Event-Report service as shown in FIG. 37, respectively.

The agent can report the test result of the data integrity test to the manager by use of this DATA-INTEGRITY-TEST-REPORT service. It is possible to know the test result of which data integrity test is reported by use of the Test Object Class parameter and the Test Object Instance parameter the parameters of the primitives of the request and indication of the DATA-INTEGRITY-TEST-REPORT service. The time when the test result is reported can be known by use of the Report Time parameter. The test result of the data integrity test can be known by use of the Test Result parameter. Whether or not the reported test result is the last one can be known by use of the Last Report parameter. The information other than the test result of the data integrity test can be known by use of the Other Information parameter.

The FUNCTION-TEST-REPORT service is the one by which the agent reports the test result of the function test to the manager. This service consists of the primitives of the request and indication and has the parameters shown in FIG. 24. These parameters are mapped to the primitives of the request and indication of the m-Event-Report service of CMISE 220, 225 as shown in FIG. 38, respectively.

The agent can report the test result of the function test to the manager by use of this FUNCTION-TEST-REPORT service. It is possible to know the test result of which function test is reported by use of the Test Object Class parameter and the Test Object Instance parameter as the parameters of the primitives of the request and indication of the FUNCTION-TEST-REPORT service shown in FIG. 24. The time at which the test result is reported can be known by use of the Report Time parameter. The test result of the function test can be known by use of the test result parameter. Whether or not the reported test result is the last one can be known by use of the Last Report parameter. The information other than the test result of the function test can be known by use of the Other Information parameter.

In FIGS. 11 through 24, the mandatory degree of each parameter means the following.

(1) M . . . Mandatory:

This means the parameter which becomes mandatory irrespective of the condition, state, etc.

(2) U . . . User Option:

This means the parameter which is used in accordance with the application utilizing the services described above.

(3) C . . . Conditional:

This means the parameter which is used in accordance with the condition in which the services are used.

Next, the meaning of each parameter shown in FIGS. 11 to 24 will be explained.

Invoke Identifier:

This is a parameter for making the primitives of the request and confirm of the service correspond to the primitives of the indication and response one-to-one.

Test Object Class:

This is a parameter for distinguishing the object classes of the test object.

Test Object Instance:

This is a parameter for distinguishing the object instances of the test object.

Enrol Time & Create Time:

They are parameters representing the creation time of the test object.

Attribute List:

This is a list of the attribute values of the test object, for example, a location or identification number.

Deenrol Time and Delete Time:

They are parameters representing the time of deletion of the test object.

Errors:

This is a parameter representing the cause of failure if the service fails.

Test State:

This is a parameter which represents the test state of the test object.

Change Time:

This is a parameter which represents the time at which the test state of the test object is changed.

Attribute Identifier List:

This is a list of identifiers which represent the attributes of the test object.

Get Time:

This is a parameter which represents the time at which the attribute values of the test object are collected.

Report Time:

This is a parameter which presents the time at which the test result is reported, and which is kind of the attribute values of the test object.

Test Result:

This is a parameter which represents the test result of the test object.

Last Report:

This is a parameter which represents whether the report of the test result of the test object is the last one or still continues.

Other Information:

This is the parameter which represents the attribute value other than the test result of the test object. It can be a future option.

Next, each object class of the test object will be explained. The test objects are classified into four kinds, that is, Connectivity Test Class, Loopback Test Class, Data Integrity Test Class and Function Test Class, in accordance with the kinds of tests described in the ISO Paper No. N3312.

The Connectivity Test Class is a test for confirming whether or not connection can be established between two entities. The Connectivity Test Class has the attributes shown in FIG. 39. The attributes have the following means.

Test State:

This represents the test state of the test object.

Timeout Period:

This represent the maximum time which can be used for establishing connection between the entities.

Tested Object:

This represents the entity which transmits the connection establishment request among the entities.

Pair Object:

This represents the entity which receives the connection establishment request among the entities.

Established Time:

This represents the time which is required for the establishment of connection.

Report Time:

This represents the time at which the test result of the test object is reported.

Last Report:

This represents whether the report of the test result of the test object is the last report or still continues.

Test Result:

This represents the test result of the test object.

Effective Time:

This represents the maximum value of the time in which the test object is not deleted, when the operation is not executed for the test object or an event does not occur for the test object.

The Loopback Test Class is a test for confirming the state of the line till a loopback point by looping back suitable test data to the suitable loopback point. The Loopback Test Class has the attributes shown in FIG. 40. The attributes have the following meaning.

Test State, Report Time, Last Report, Test Result and Effective Time have the same meaning as those of the Connectively Test Class described already.

Source Object:

This represents a managed object which transmits the test data of the loopback test.

Destination Object:

This represents a managed object which receives the test data of the loopback test.

Intermediate Object:

This represents the loopback point of the test data of the loopback test.

Timeout Period:

This represents the maximum time which can be used for the execution of the loopback test.

The Data Integrity Test Class is a test for confirming that no change exists in the data exchanged between the two entities. The Data Integrity Test Class has the attributes shown in FIG. 41. The attributes have the following meaning.

Test State, Report Time, Last Report, Test Result and Effective Time have the same meaning as those of the attributes of the Connectivity Test Class.

Timeout Period:

This represents the maximum time which can be used for the execution of the Data Integrity Test.

Tested Object:

This represents the entity which transmits the test data of the Data Integrity Test among the entities.

Pair Object:

This represents the entity which receives the test data of the Data Integrity Test.

Test Data:

This represents the test data of the data integrity test which is exchanged between the entities.

Failure Cause:

This represents the cause of failure when the data integrity test fails.

The Function Test Class described above is a test for confirming the function of the managed object. The Function Test Class has the attributes shown in FIG. 42. The attributes have the following meaning.

Test State, Report Time, Last Report, Test Result and Effective Time have the same meaning as that of the attributes of the Connectivity Test Class described already.

Tested Object:

This represents the managed object.

Timeout Period:

This represents the maximum time which can be used for the execution of the function test.

Next, the definite protocols between the manager and the agent that comprise the subject invention will be explained.

Figure 43:
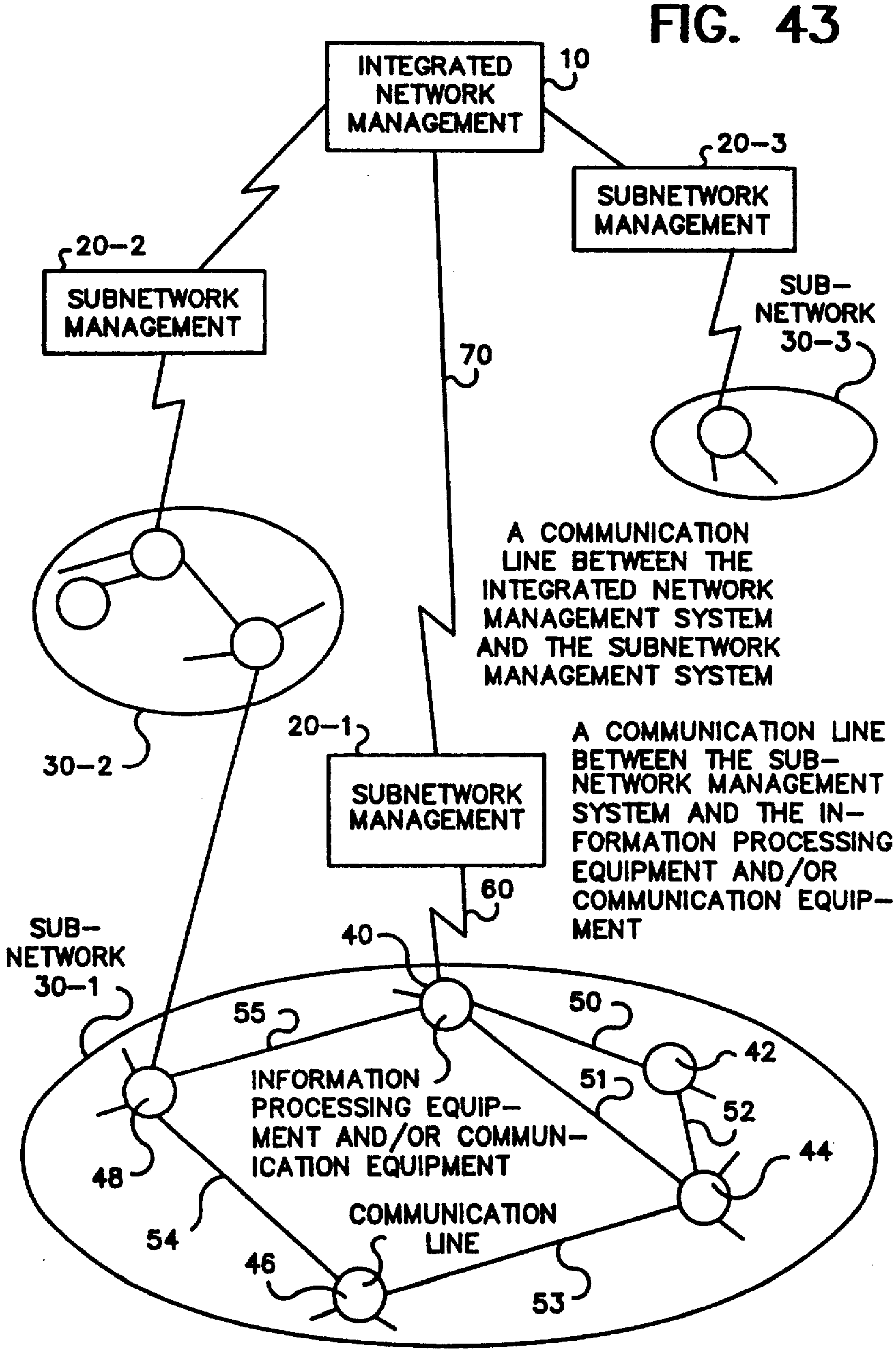
FIG. 43 is a schematic view of a network system comprising an integrated network management system, subnetwork management system and information processing and communication equipment (subnetwork) assembled in accordance with the present invention.

FIG. 43 is a diagram showing the connection relation between the integrated network management system 10, the subnetwork management systems 20-1 to 20-3 and information processing equipment and communication equipment 30-1 to 30-3 which comprise the managed objects. The integrated network management system 10 functions as the manager and the subnetwork management system 20 functions as the agent.

The integrated network management system 10 is connected to the subnetwork management systems 20-1 to 20-3 by the communication line 70 between the integrated network management system and the subnetwork management systems and exchanges the network management information between it and the subnetwork management systems 20-1 to 20-3.

The information processing equipment and communication equipment 40, 42, 44, 46, 48 are connected by the communication lines 50, 51, 52, 53, 54, 55 and constitute the subnetworks. The subnetwork management system 20-1 is directly connected to the information processing equipment and communication equipment 40 by the communication line 60 between the subnetwork management system and the information processing equipment and communication equipment, and is connected indirectly to the information processing equipment and communication equipment 42, 44, 46, 48 through the information processing equipment and communication equipment 40, and thereby exchanges the network management information. The subnetwork management system 20 may be connected directly to the information processing equipment and communication equipment 42, 44, 46, 48 through the communication line.

Figure 44:
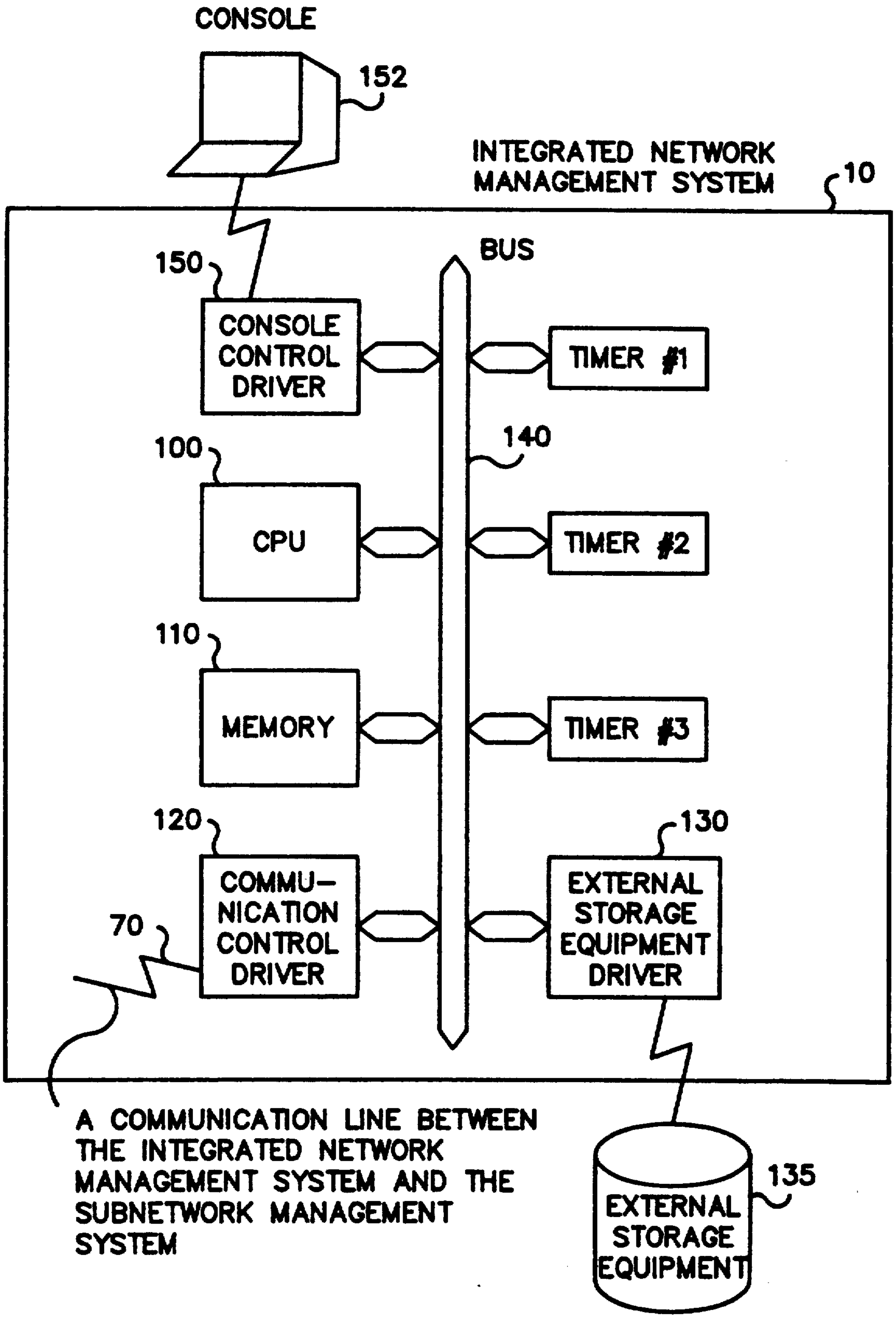
FIG. 44 is a block diagram of the integrated network management system of FIG. 43; and, FIG. 45 is a block diagram of the subnetwork management system of FIG. 43.

The configuration of the integrated network management system 10 and subnetwork management system 20 will be explained with reference to FIGS. 44 and 45. FIG. 44 is a block structural view of the integrated network management system 10. A CPU 100 executes the test protocol in accordance with the present invention by use of the test application program stored in a memory 110. A communication control driver 120 also utilizes the test protocol of the present invention. The network management information that is exchanged between the integrated network management system 10 and the subnetwork management system is stored in external storage equipment 135. A console control driver 150 provides an interface with a network manager through a console 152. The CPU 100, the memory 110, the communication control driver 120, the external storage equipment driver 130 and the console control driver 150 are connected through a common bus 140.

Figure 45:
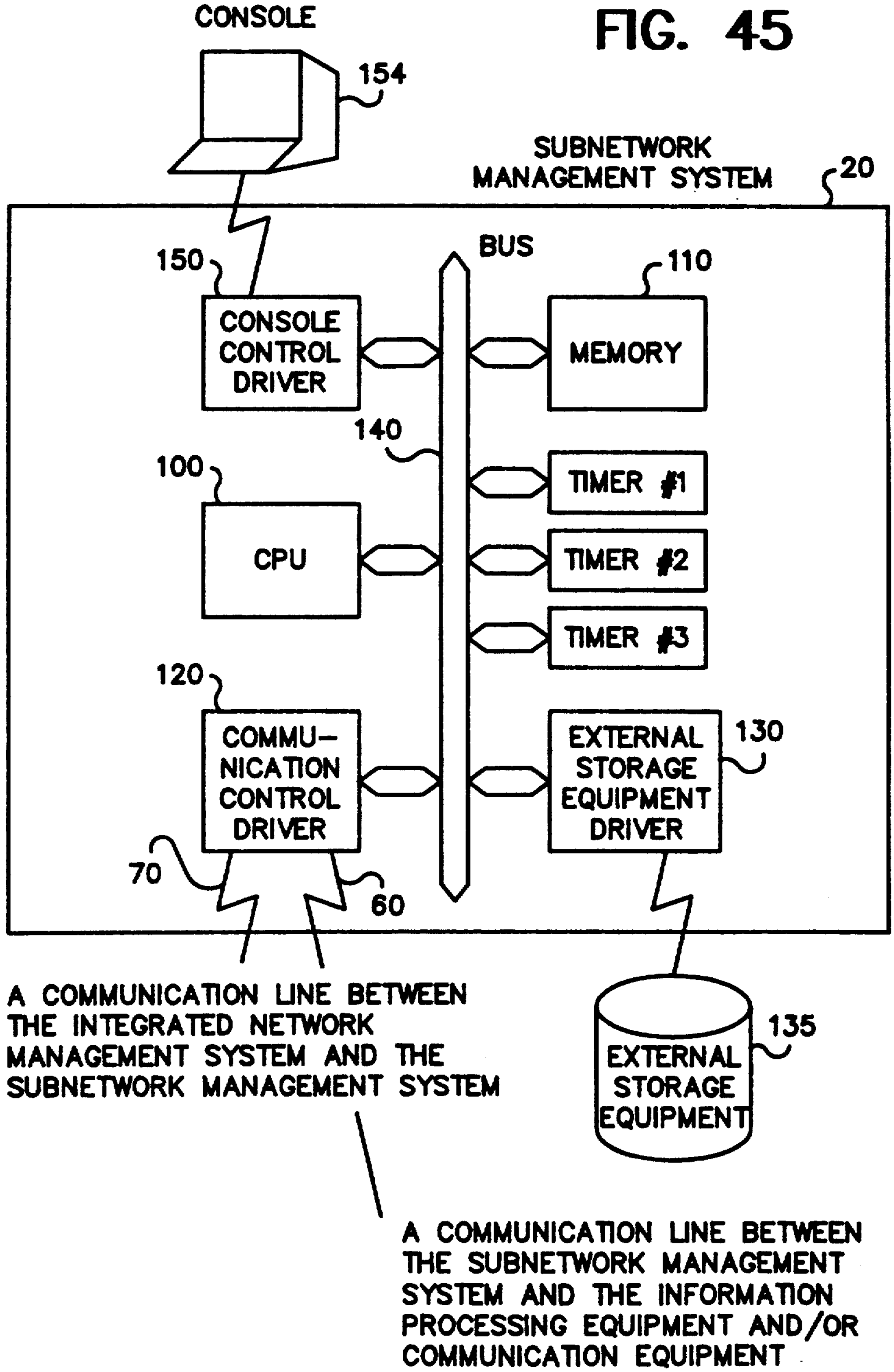

FIG. 45 is a block structural view of the subnetwork management system 20. The function of each block is substantially the same as that of the integrated network management system 10 described above, but is different in that the communication control driver 120 makes the communication control with the information processing equipment and communication equipment 40, 42, 44, 46, and 48.

It is a feature of this embodiment, that the integrated network management system 10 and the subnetwork management system 20 use three kinds of timers for the test protocol. These timers have the following functions.

(1) Timer #1:

This is a timer for deleting the test object when no operation is made for the created test object. It is designated by the Effective Time of the test object.

(2) Timer #2:

This is a timer for confirming that confirm exists for the request transmitted in the case of the confirm type service.

(3) Timer #3:

This is a timer for judging whether or not the test exceeds the maximum time within which the test is executable. It is designated by the Timeout Period of the test object.

When the Timer #1 times out, the agent has caused a timeout and therefore deletes the test object and suspends the test. The manager recognizes that the test object is deleted and the test is suspended.

When the Timer #2 times out, the manager tries again for a predetermined number of times the service that has timed out.

When the Timer #3 times out, the agent suspends the test. The manager recognizes that the test is suspended.

Hereinafter, the CONNECTIVITY-TEST-REPORT service, the LOOPBACK-TEST-REPORT service, the DATA-INTEGRITY-TEST service and the FUNCTION-TEST-REPORT service will be generically referred to as the "TEST-REPORT services".

With reference to FIG. 1, the protocol (the first protocol) will be explained between the test function invoker functional unit and the test function performer functional unit when the subnetwork management system 20 reports autonomously the result of the test conducted for the information processing equipment and communication equipment to the integrated network management system 10.

When the subnetwork management system 20 executes the test autonomously, it creates the test object of the object class corresponding to the kind or "class" of test executed in this subnetwork management system 20. The subnetwork management system 20 reports to the integrated network management system 10 that the test object is created, by use of the request (400) of the TEST-ENROL service, and then executes the test. The TEST-ENROL service request/indication parameter list is shown in FIG. 11.

Being informed of the creation of the test object by the indication (400) of the TEST-ENROL service, the integrated network management system 10 recognizes that the test object described above is created in the subnetwork management system 20, and starts the internal Timer #1.

The subnetwork management system 20 sequentially reports to the integrated network management system 10 the test results of the test which the subnetwork management system 20 executes autonomously, by use of the request (500) of the TEST-REPORT service. As noted above, all the different test reporting services have been grouped together for simplicity in this description but are more particularly shown in FIGS. 21-24. If it is the last report of the test results, it terminates the test by interpreting the value of the parameter of the Last Report parameter of the request (510) of the TEST-REPORT service as "True".

On each receiving of the indications (500, 510) of the TEST-REPORT services, the integrated network management system 10 stops the Timer #1, conducts processing such as the display of the test result, and again starts the Timer #1.

The subnetwork management system 20 reports to the integrated network management system 10 the suspension of the test which the subnetwork management system 20 executes autonomously, by utilizing the request (600) of the TEST-DEENROL service (FIG. 12). Thereafter, the subnetwork management system 20 deletes the test object and the integrated network management system 20 deletes the test object.

Receiving the indication (600) of the TEST-DEENROL service, the integrated network management system 10 suspends the Time #1 and recognizes deletion of the test object in the subnetwork management system 20.

Figure 2:
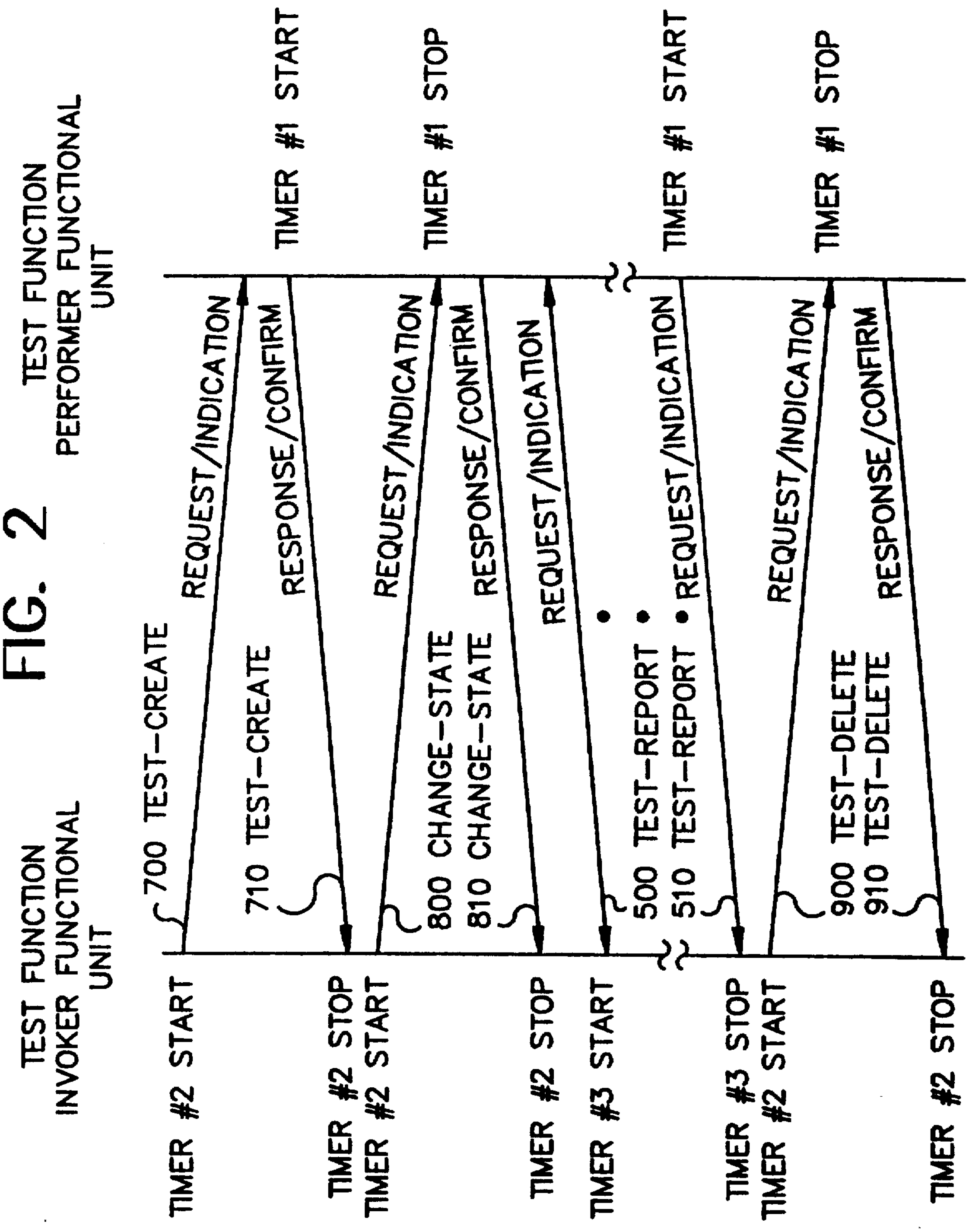
FIG. 2 is a flow diagram showing the protocol sequence of a test having an implicit reporting mechanism and an implicit termination mechanism between the manager and the agent in accordance with the present invention.

With reference to FIG. 2, the sequence of a second protocol is explained between the test function invoker functional unit and test function performer functional unit having an implicit reporting mechanism and an implicit termination mechanism.

When the integrated network management system 10 instructs the subnetwork management system to execute the test, it generates a request (700) of the TEST-CREATE service to the subnetwork management system 20, which requests the creation of the test object of the object class corresponding to the kind of the test to be executed and at the same time, starts the Timer #2 inside the integrated network management system 10.

Receiving the indication (700) of the TEST-CREATE service (FIG. 13), the subnetwork management system 20 creates the test object and gives the object instance name to it. This object instance name is given in such a manner as not to overlap with other object instance names of other management objects which the subnetwork management system 20 manages at the point of reception of the indication (700) of the TEST-CREATE service. It reports this object instance name to the integrated network management system 10 as the value of the Test Object Instance parameter of the response (710) of the TEST-CREATE service. The Timer #1 of the subnetwork management system 20 is also started simultaneously.

Receiving the confirm (710) (FIG. 14) of the Test-Create Service, the integrated network management system 10 suspends the Timer #2 of the integrated network management system 10. Then, it requests the subnetwork management system 10 to change the test state of the test object to the initiation state by the request (800) (FIG. 17) of the CHANGE-STATE service, and instructs the subnetwork management system to execute the test.

When requested to change the test state of the test object to the initiation state by the indication (800) of the CHANGE-STATE service, the subnetwork management system 20 suspends the Timer #1 in the subnetwork management system 20 and executes the test as described above. When the execution of this test proves successful, the subnetwork management system 20 returns the response (810) of the CHANGE-STATE service to the integrated network management system 10.

Receiving the confirm (810) (FIG. 18) of the CHANGE-STATE service, the integrated network management system 10 suspends the Timer #2 in the integrated network management system 10 and starts the Timer #3 in the integrated network management system 10.

The subnetwork management system 20 reports the test results of the test it has executed to the integrated network management system 10 by the request (500) of the TEST-REPORT service, just as in the first protocol. In the case of the request (510) of the last TEST-REPORT service which reports the test results, the subnetwork management system 20 starts the Timer #1 of the subnetwork management system 20 and changes the test state of the test object to the idle state. In other words, this test is terminated automatically.

Receiving the indication (500) of the TEST-REPORT service, the integrated network management system 10 conducts processing such as the display of the test result. Particularly when the indication is the indication (510) of the last TEST-REPORT service, it suspends the Timer #3 of the integrated network management system 10.

when the test is suspended, the integrated network management system 10 requests the subnetwork management system 20 to delete the test object by the request (900) of the TEST-DELETE service (FIG. 15). At the same time, the integrated network management system 20 starts the timer #2.

Receiving the indication (900) of the TEST-DELETE service, the subnetwork management system 20 suspends the Timer #1 of the subnetwork management system 20 and deletes the test object. Thereafter it sends the response to the integrated network management system 10 by the response (910) of the TEST-DELETE service (FIG. 16).

Receiving the confirm (910) of the TEST-DELETE service, the integrated network management system 10 suspends the Timer #2 of the integrated network management system 10.

Figure 3:
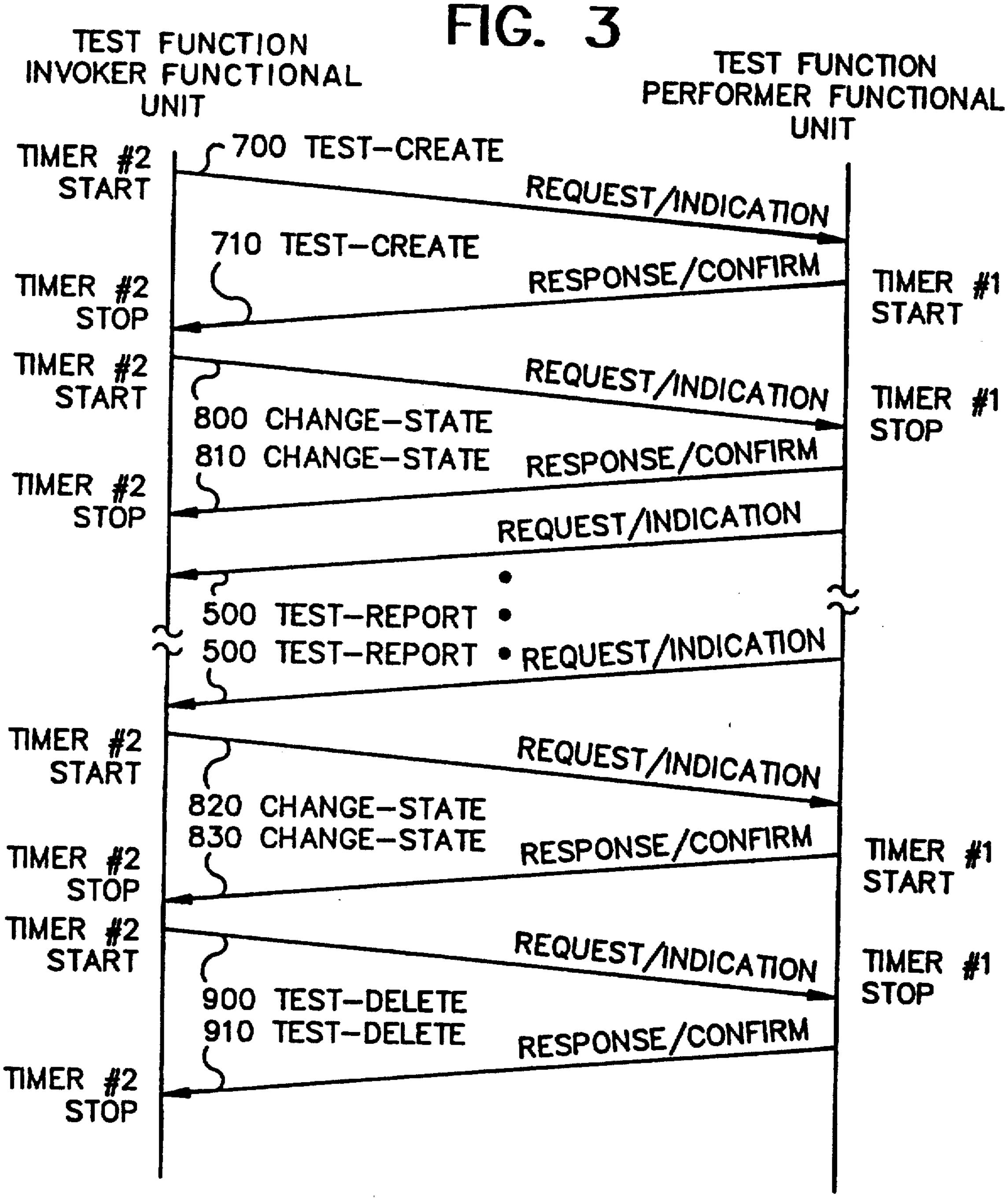
FIG. 3 is a flow diagram showing the protocol sequence of a test having an explicit reporting mechanism and an implicit termination mechanism between the manager and the agent in accordance with the present invention.

With reference to FIG. 3, a third protocol sequence will be explained between the test function invoker functional unit and test function performer functional unit having an implicit reporting mechanism and an explicit termination mechanism.

When the test is executed, the integrated network management system 10 creates the request (700) of the TEST-CREATE service and requests the creation of the test object for the subnetwork management system 20, and at the same time, the integrated network management system 10 executes the Timer #2, just as in the second protocol.

Receiving the indication (700) of the TEST-CREATE service, the subnetwork management system 20 creates the test object and gives the object instance name to it. This object instance name is given in such a manner as not to be the same as any one of the object instance names of other managed objects which are managed by the subnetwork management system 20 at that point. This object instance name is reported as the value of the parameter of the Test Object Instance of the response (710) of the TEST-CREATE service to the integrated network management system 10. In the subnetwork management system 20, the Timer #1 is also executed simultaneously.

Receiving the confirm (710) of the TEST-CREATE service, the integrated network management system 10 suspends the Timer #2 of the integrated network management system 10. It requests to change the test state of the test object to the initiation state by the request (800) of the CHANGE-STATE service and instructs the execution of the test.

When requested to change the test state of the test object to the initiation state by the indication (800) of the CHANGE-STATE service, the subnetwork management system 20 suspends the Timer #1 in the subnetwork management system 20 and executes the test described above. When the execution of this test proves successful, it returns the response (810) of the CHANGE-STATE service to the integrated network management system 10.

Receiving the confirm (810) of the CHANGE-STATE service, the integrated network management system 10 suspends the Timer #2 of the integrated network management system 10.

The subnetwork management system 20 reports the test result of the executed test to the integrated network management system 10 by the request (500) of the TEST-REPORT service.

Receiving the indication (500) of the TEST-REPORT service, the integrated network management system 10 conducts processing such as the display of the test result.

It is a particular feature of the third protocol that to terminate the test, the integrated network management system 10 requests the subnetwork management system 20 to change the test state of the test object to the idle state by the request (820) of the CHANGE-STATE service (FIG. 17) and executes the Timer #2 of the integrated network management system 10.

When the subnetwork management system 20 is requested to change the test state of the test object to the idle state by the indication (820) of the CHANGE-STATE service, the test is terminated. After the test is terminated, the subnetwork management system 20 sends the response to the integrated network management system 10 by utilizing the response (830) (FIG. 18) of the CHANGE-STATE service. At the same time, the subnetwork management system 20 starts the Timer #1.

Receiving the confirm (830) of the CHANGE-STATE service, the integrated network management system 10 suspends the Timer #2 of the integrated network management system 10.

To suspend the test, the integrated network management system 10 requests the subnetwork management system 20 to delete the test object by use of the request (900) of the TEST-DELETE service. At the same time, the integrated network management system 10 starts the Timer #2.

Receiving the indication (900) of the TEST-DELETE service, the subnetwork management system 20 suspends the Timer #1 of the subnetwork management system 20 and deletes the test object. Thereafter, it sends the response to the integrated network management system 10 by the response (910) of the TEST-DELETE service.

Receiving the confirm (910) of the TEST-DELETE service, the integrated network management system 10 suspends the Timer #2 of the integrated network management system 10.

Figure 4:
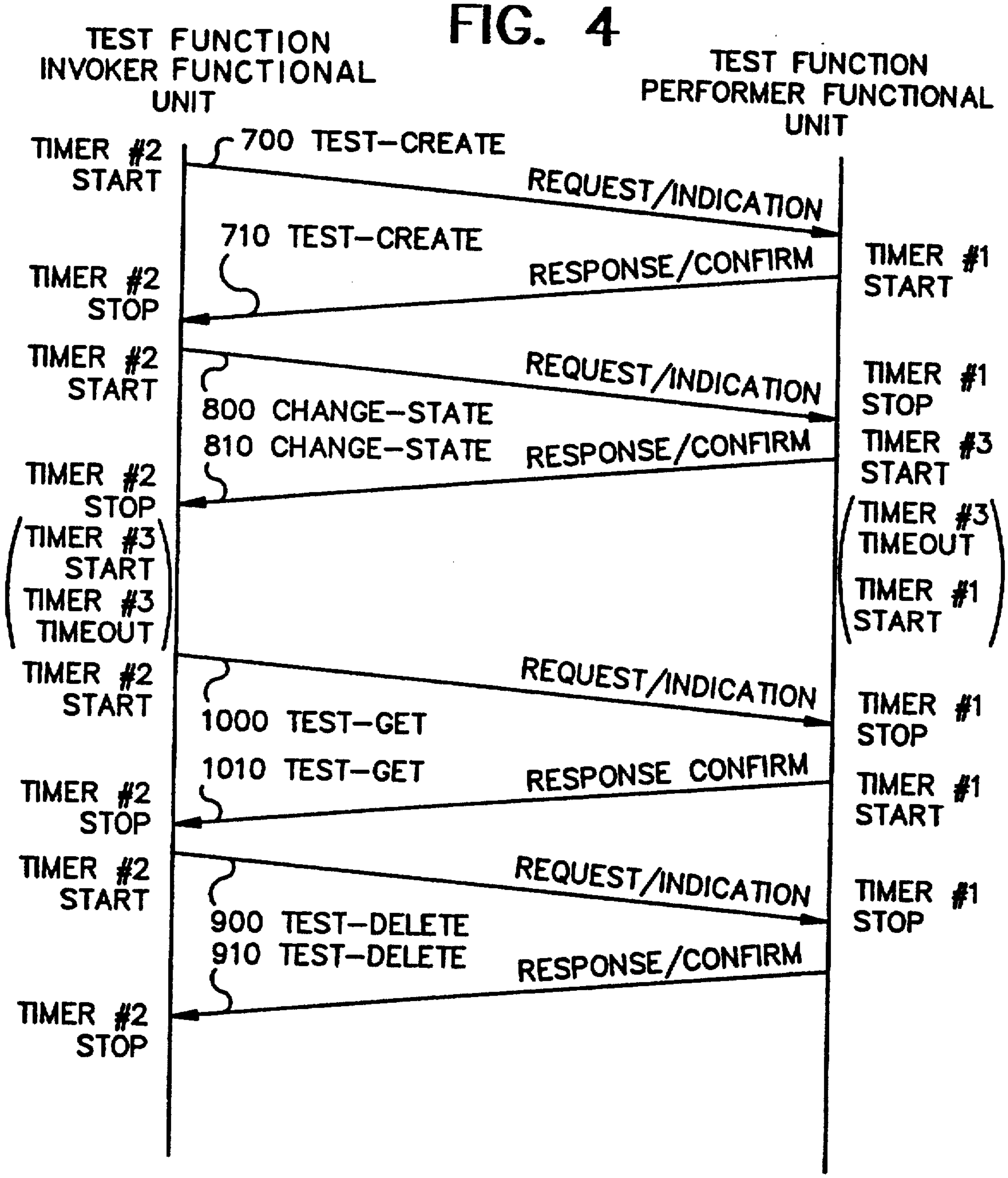
FIG. 4 is a flow diagram showing the protocol sequence of a test having an explicit reporting mechanism and an implicit termination mechanism between the manager and the agent in accordance with the present invention.

With reference to FIG. 4, the fourth protocol sequence will be explained between the test function invoker functional unit and test function performer functional unit having an explicit reporting mechanism and an implicit termination mechanism.

To execute the test having an explicit reporting mechanism and implicit termination mechanism, the integrated network management system 10 creates the request (700) of the TEST-CREATE service and requests the subnetwork management system 20 to create the test object in accordance with the kind of the test to be executed, just as in the second protocol. At the same time, the integrated network management system starts the Timer #2.

Receiving the indication (700) of the TEST-CREATE service, the subnetwork management system 20 creates the test object and gives the object instance name to it. This object instance name must be given in such a manner as not to be the same as any one of the object instance names of other managed objects which the subnetwork management system 20 manages at that point. The object instance name is reported to the integrated network management system 10 as the value of the parameter of the Test Object Instance of the response (710) of the TEST-CREATE service. At the same time, the Timer #1 of the subnetwork management system is started.

Receiving the confirm (710) of the TEST-CREATE service, the integrated network management system 10 suspends the Timer #2 of the integrated network management system 10. It requests the subnetwork management system 20 to change the test state of the test object to the initiation state by the request (800) of the CHANGE-STATE service and instructs the latter to execute the test.

When the subnetwork management system 20 receives the indication (800) of the CHANGE-STATE service from the integrated network management system 10 and is requested to change the test state of the test object to the initiation state, the subnetwork management system 20 suspends the Timer #1 and executes the test. When the execution of the test proves successful, it returns the response (810) of the CHANGE-STATE service to the integrated network management system 10 and starts the Timer #3. The subnetwork management system 20 executes the test until the internal Timer #3 comes to timeout.

Receiving the confirm (810) of the CHANGE-STATE service, the integrated network management system 10 suspends the Timer #2 of the integrated network management system 10 and starts the Timer #3 of the integrated network management system 10.

When the time of the Timer #3 has run out in the subnetwork management system 20, the subnetwork management system 20 terminates (automatically) the test, changes the test state of the test object to the idle state and starts the Timer #1 of the subnetwork management system 20.

It is a particular feature of the fourth protocol that when the time of the Timer #3 has run out in the integrated network management system 10, the integrated network management system 10 creates the request (1000) (FIG. 19) of the TEST-GET service and requests the subnetwork management system 20 to report the test result of the test object. At the same time, the integrated network management system 10 starts the Timer #2.

Receiving the indication (1000) of the TEST-GET service, the subnetwork management system 20 suspends the Timer #1 of the subnetwork management system 20 and returns the test result of the test as the value of the parameter of the Attribute List parameter of the response (1010) (FIG. 20) of the TEST-GET service to the integrated network management system 10. It changes the test state of the test object to the idle state and starts the Timer #1 of the subnetwork management system 20.

Receiving the confirm (1010) of the TEST-GET service, the integrated network management system 10 suspends the Timer #2 of the integrated network management system 10 and conducts processing such as the display of the test result of the test.

To suspend the test executed in the subnetwork management system, the integrated network management system 10 requests the subnetwork management system 20 to delete the test object by use of the request (900) of the TEST-DELETE service and starts the Timer #2 of the integrated network management system 10.

Receiving the indication (900) of the TEST-DELETE service, the subnetwork management system 20 suspends the internal Timer #1 and deletes the test object. Thereafter, it makes response to the integrated network management system 10 by the response (910) of the TEST-DELETE service.

Receiving the confirm (910) of the TEST-DELETE service, the integrated network management system 10 suspends the Timer #2 of the integrated network management system 10.

Figure 5:
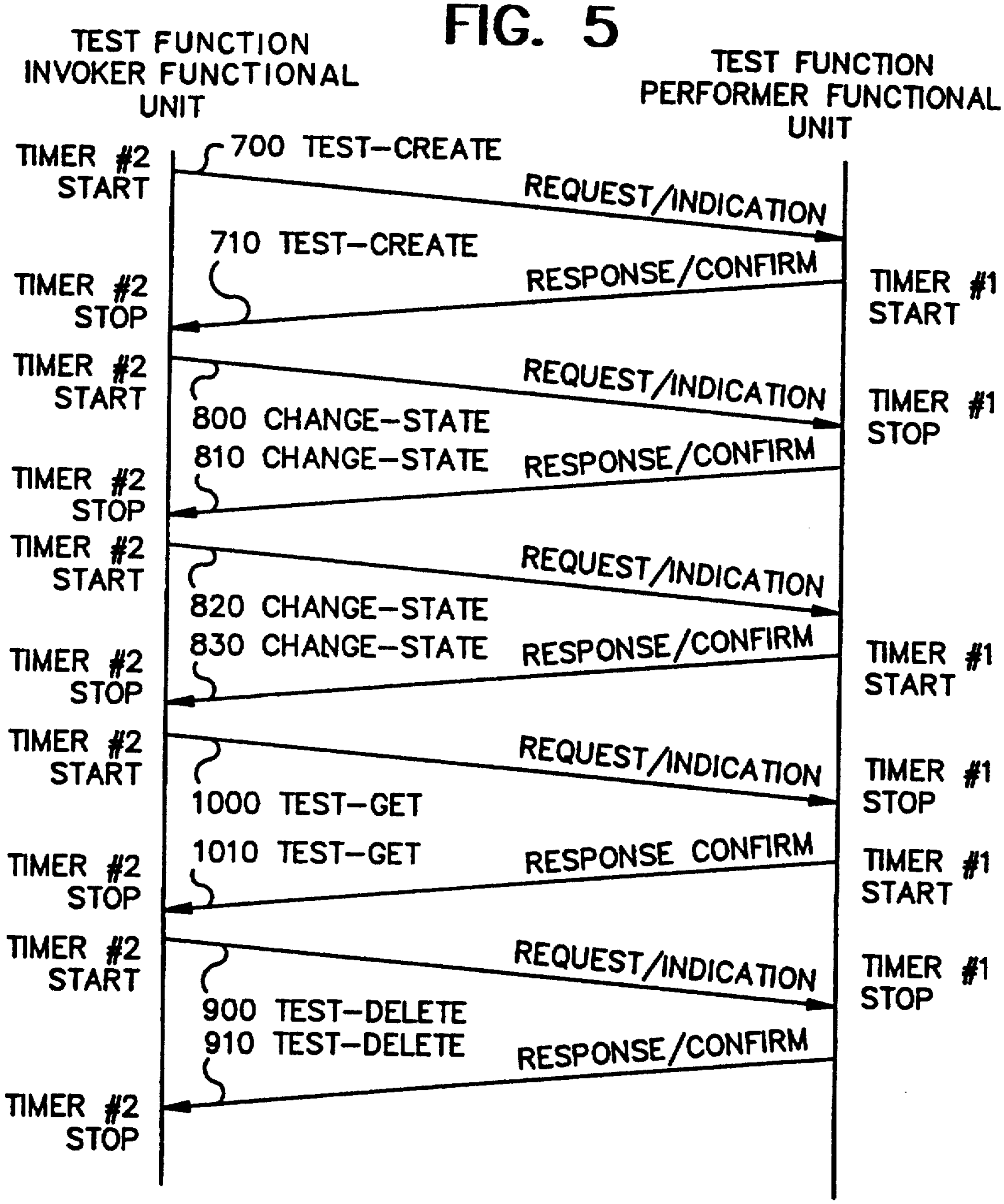
FIG. 5 is a flow diagram showing the protocol sequence of a test having an explicit reporting mechanism and an explicit termination mechanism between the manager and the agent in accordance with the present invention.

With reference to FIG. 5, the sequence of the fifth protocol will be explained between the test function invoker functional unit and the test function performer functional unit having an explicit reporting mechanism and an explicit termination mechanism.

To execute the test, the integrated network management system 10 creates the request (700) of the TEST-CREATE service and requests the subnetwork management system 20 to create the test object of the object class corresponding to the kind of the test. In the integrated network management system 10, the Timer #2 is started simultaneously.

Receiving the indication (700) of the TESTCREATE service, the subnetwork management system 20 creates the test object and gives the object instance name to it. This name is given in such a manner as not to be the same as any one of the object instance names of other managed objects which the subnetwork management system 20 manages at that point. The subnetwork management system 20 reports the object instance name to the integrated network management system 10 by the value of the parameter of the Test Object Instance parameter of the response (710) of the TEST-CREATE service. The subnetwork management system 20 starts simultaneously the Timer #1.

Receiving the confirm (710) of the TEST-CREATE service, the integrated network management system 10 suspends the Timer #2 of the integrated network management system 10. Then, it requests to change the test state of the test object to the initiation state by the request (800) of the CHANGE-STATE service and instructs subnetwork management system 20 to execute the test.

When the subnetwork management system 20 is requested to change the test state of the test object to the initiation state by the indication (800) of the CHANGE-TEST service, it suspends the internal Timer #1 and executes the test. When the execution of the test proves successful, it returns the response (810) of the CHANGE-STATE service to the integrated network management system 10.

Receiving the confirm (810) of the CHANGE-STATE service, the integrated network management system 10 suspends the Timer #2 of the integrated network management system 10.

In the subnetwork management system 20, the test result obtained by the execution of the test is held as the attribute of the test object. The execution of the test is continued until the indication is given from the integrated network management system 10 to change the test state to the idle state by the indication (820) of the CHANGE-STATE service.

To terminate the test, the integrated network management system 10 instructs the subnetwork management system 20 to change the test state of the test object to the idle state by utilizing the request (820) of the CHANGE-STATE service. The integrated network management system 10 starts simultaneously the Timer #2.

It is a particular feature of the fifth protocol that when the subnetwork management system 20 is requested to change the test state of the test object to the idle state by the indication (820) of the CHANGE-TEST service, it terminates the test, changes the test state of the test object to the idle state and then makes response to the integrated network management system 10 by utilizing the response (830) of the CHANGE-STATE service. At the same time, it starts the Timer #1 of the subnetwork management system 20.

Receiving the confirm (830) of the CHANGE-STATE service, the integrated network management system 10 suspends the Timer #2 of the integrated network management system 10.

When the integrated network management system 10 collects the test result of the test executed in the subnetwork management system 20, it requests the subnetwork management system 20 to report the test result of the test object by the indication (1000) of the TEST-GET service. At the same time, it starts the Timer #2 of the integrated network system 10.

Receiving the indication (1000) of the TEST-GET service, the subnetwork management system 20 suspends the Timer #1 of the subnetwork management system 20 and reports the test result of the test object as the value of the parameter of the Attribute List of the response (1010) of the TEST-GET service. The subnetwork management system 20 again starts the Timer #1.

Receiving the confirm (1010) of the TEST-GET service, the integrated network management system 10 suspends the Timer #2 of the integrated network management system 10 and makes processes such as the display of the test result.

To suspend the test, the integrated network management system 10 requests the subnetwork management system 20 to delete the test object, by use of the request (900) of the TEST-DELETE service. At the same time, the integrated network management system 10 starts the Timer #2.

Receiving the indication (900) of the TEST-DELETE service, the subnetwork system 20 suspends the Timer #1 and deletes the test object. Thereafter, it sends a response to the integrated network management system 10 by the response (910) of the TEST-DELETE service.

Receiving the confirm (910) of the TEST-DELETE service, the integrated network management system 10 suspends the Timer #2 of the integrated network management system 10.

It is a particular operational advantage of the present invention that even if communication failure occurs and any of the primitives of the services of the invention disappear, a state cannot occur where the test object remains longer than its proper period so that the test does not properly terminate.

A protocol processor for processing exclusively at least one of the foregoing first to fifth protocols provides a network management method and system suitable for improved network management.

Having thus described the invention, we now claim:

1. A network management method for a network system including a plurality of agents for managing sub-networks individually, and a manager for managing said network as a whole in communication with the agents, wherein the manager includes a timer, the method comprising the steps of:

setting a predetermined period in the timer for time-out of a test for a one of the sub-networks;

autonomously notifying said manager by a one of the agents that manages the one sub-network of a content of the test comprising an identification of preselected test steps to be taken;

executing the test in accordance with said test content;

reporting by the agent of a test result to said manager;

executing autonomously by the agent of a termination process; and sending a termination report of the test to said manager;

selectively starting and suspending the timer in response to the notifying and sending; and, instructing the agent by the manager to terminate the test when the timer has timed out to the predetermined period.

2. A network management method for a network system including a manager for managing the network system as a whole and a plurality of agents for individually managing sub-networks in communication with each of the agents, the manager having first and second timers, the system including a first test mode wherein the agent autonomously executes a first test for an arbitrary one of the sub-networks and a second test mode wherein the manager arbitrarily executes a second test for the one of the sub-networks;

the first test mode comprising the steps of:

the agent autonomously notifying the manager of a content of the first test;

the agent executing the first test in accordance with the content of the first test;

the agent sequentially reporting a test result to the manager; and the manager selectively starting and suspending the first timer in response to the notifying and reporting, respectively, and the manager instructing the agent to terminate the first test when the first timer has timed out to a first preselected timeout comprising a maximum time limit for an agent to sequentially report;

the second test mode comprising the steps of:

the manager instructing the agent managing said one of the sub-networks, with an instruction relating to a test content for the second test;

selectively executing said suspending the second test;

the manager starting and suspending the second timer in accordance with sending the instruction and receiving a predetermined response content from the agent in response to the instruction, respectively; and, the manager terminating the test by sending a terminating instruction to the agent when the second timer has timed out to a second preselected timeout or last report of the test result is made by the agent, the second preselected timeout comprising a maximum time limit for the agent to respond to the instruction.

3. The network management method according to claim 2, wherein the agent includes a third timer having a third predetermined timeout period comprising a maximum time for receiving a sequential instruction from the manager in the second test of the second test mode, further including:

starting the third timer in the second test mode when responding to the instruction from the manager;

suspending the third timer when receiving a sequential instruction from the manager; and, terminating the second test when the manager receives the last report of the test sent from the agent or when the third timer comes to timeout.

4. The network management method according to claim 2, wherein the manager includes a third timer, the method further including:

starting the third timer in said second test mode in accordance with receiving a response content from the agent; and, the manager giving an instruction to the agent to report a test report of the agent after timeout of said third timer.

5. The network management method according to claim 4, further including the manager suspending the third timer in accordance with receiving a last report of the test from the agent, and sending a termination instruction of the test irrespective of the last report when the third timer comes to timeout.

6. A network system comprising a plurality of agents for managing individually subnetworks and a manager connected to each of said agents, for managing said network as a whole, wherein said agents are equipped with testing means for conducing a test in accordance with a test content designated for said subnetwork and test managing means including means for autonomously designating the test content for said testing means, means for executing the test, means for notifying said manager apparatus of the executing of the test and the test content, means for reporting sequentially the result of the test conducted by said testing means and means for giving a termination instruction of the test to said testing means after the test is terminated, said manager having timer means for setting arbitrarily a period from start till timeout in accordance with a report content from said agents, and means for starting or suspending said timer means in accordance with the report content, and giving the termination instruction of the test to said managing means when said timer means comes to timeout.

7. The network system according to claim 6, wherein said manager means includes instruction means for giving to said agent a designating instruction defining a test request and test content for an arbitrary sub-network, an execution instruction of execution or suspension of test operation to be executed in accordance with the test content and the termination instruction of the test to be made in response to a report of the test result, and with second timer means capable of setting arbitrarily the period from the start till timeout in accordance with each of said instructions to said agent apparatus, and means for starting said second timer means in accordance with each instruction to said agent apparatus, suspending said second timer means in accordance with a response content sent from said agent in response to each instruction, and giving the termination instruction of the test to said test managing means of said agent apparatus when said second timer means comes to timeout.

8. The network system according to claim 7, wherein said manager apparatus is further equipped with third timer means for setting arbitrarily the period from the start till timeout, and includes means for starting said third timer means in accordance with a predetermined response content from said agent apparatus, suspending said third timer means in accordance with a last test report sent from said agent apparatus, and giving the termination instruction irrespective of the existence of the last report of the test result when said third timer means comes to timeout.

9. The network system according to claim 7, wherein said manager apparatus is further equipped with third timer means for setting arbitrarily the period from the start till timeout, and means for starting said third timer means in accordance with a predetermined response content from said agent apparatus, and given an instruction to report altogether the result of the test made by said agent apparatus after timeout of said third timer means.

10. The network system according to claim 7 wherein said agent apparatus is equipped with fourth timer means capable of setting arbitrarily the period from the start till timeout, and includes means for starting said fourth timer means in accordance with a response content delivered in response to each instruction from said manager apparatus, suspending said timer means in accordance with a predetermined instruction content from said manager apparatus, and making autonomously the test termination irrespective of the existence of the test termination instruction from said manager apparatus when said fourth timer means comes to timeout.

11. A timing system of a network system suitable for establishing fault management protocols in a testing scheme between a manager which manages the network system and a plurality of agents which manage sub-networks of the network system, the timing system comprising:

a first timing means for setting a first timing period for at least a first portion of the testing scheme in response to a first of a plurality of report signals generated by a one of the plurality of agents, the first timing means is selectively activated and deactivated by the network manager in response to a second of the plurality of report signals and the first timing means includes menas for indicating to the manager that at least the first portion of the test scheme be terminated upon expiration of the first timing period;

a second timing means for setting a second timing period for at least a second portion of the testing scheme in response to a first of a plurality of instructions generated by the manager, the second timing means is selectively activated and deactivated based on a second of the plurality of instructions and the second timing means includes means for indicating to the manager that at least the second portion of the testing scheme be terminated upon expiration of the second timing period;

a third timing means for setting a third timing period for at least a third portion of the testing scheme, said third timing means is activated in response to a third of the plurality of report signals and deactivated in response to a last of the plurality of report signals and the third timing means includes means for indicating to the manager that at least the third portion of the testing scheme be terminated upon expiration of the third timing period, irrespective of the existence of the last of the plurality of report signals;

a fourth timing means for setting a fourth timing period for at least a fourth portion of the testing scheme, the fourth timing means is selectively activated and deactivated in response to the plurality of instructions sent from the manager and the fourth timing means includes means for indicating to the agent that at least the fourth portion of the testing scheme be terminated upon expiration of the fourth timing period irrespective of the plurality of instructions sent from the manager.

* * * * *

UNITED STATES PATENT AND TRADEMARK OFFICE
CERTIFICATE OF CORRECTION

PATENT NO. : 5,204,955

DATED : April 20, 1993

INVENTOR(S) : Takashi Kagei, et al.

It is certified that error appears in the above-identified patent and that said Letters Patent is hereby corrected as shown below:

Claim 6, column 23, line 64, delete "conducing" and substitute therefor --conducting--.

Claim 9, column 24, line 48, delete "given" and substitute therefor --giving--.

Claim 11, column 25, line 10, delete "menas" and substitute therefor --means--; and,
line 11, delete "test" and substitute therefor --testing--.

Signed and Sealed this

Twenty-first Day of December, 1993

*Attest:*

BRUCE LEHMAN

*Attesting Officer*

*Commissioner of Patents and Trademarks*